United States Patent
Artioli et al.

(10) Patent No.: US 12,454,590 B2
(45) Date of Patent: Oct. 28, 2025

(54) HYDROGEL

(71) Applicant: ILLUMINA CAMBRIDGE LIMITED, Cambridge (GB)

(72) Inventors: Gianluca Andrea Artioli, Cambridge (GB); Andrew A. Brown, Cambridge (GB); Wayne N. George, Ilford (GB); Colin Pilkington, London (GB); Jem Pitcairn, Nottingham (GB); Alexandre Richez, Cambridge (GB); Xavier von Hatten, Cambridge (GB)

(73) Assignee: Ilumina Cambridge Limited, Cambridge (GB)

( * ) Notice: Subject to any disclaimer, the term of this patent is extended or adjusted under 35 U.S.C. 154(b) by 964 days.

(21) Appl. No.: 17/600,072

(22) PCT Filed: Dec. 1, 2020

(86) PCT No.: PCT/EP2020/084163
§ 371 (c)(1),
(2) Date: Sep. 29, 2021

(87) PCT Pub. No.: WO2021/110700
PCT Pub. Date: Jun. 10, 2021

(65) Prior Publication Data
US 2022/0185927 A1 Jun. 16, 2022

Related U.S. Application Data

(60) Provisional application No. 62/942,527, filed on Dec. 2, 2019.

(30) Foreign Application Priority Data

Jan. 24, 2020 (NL) ..................................... 2024749

(51) Int. Cl.
C08F 220/56 (2006.01)
C08F 2/38 (2006.01)
C08F 220/60 (2006.01)

(52) U.S. Cl.
CPC ............ *C08F 220/603* (2020.02); *C08F 2/38* (2013.01); *C08F 2438/03* (2013.01)

(58) Field of Classification Search
CPC .. C09D 133/24; C08F 220/54; C08F 220/603; C08F 2438/00; C08F 2438/03
See application file for complete search history.

(56) References Cited

U.S. PATENT DOCUMENTS 10,370,476 B2  8/2019 Alli et al.
10,371,865 B2  8/2019 Alli et al.
(Continued)

FOREIGN PATENT DOCUMENTS

JP  2010065082 A  3/2010
JP  2012529972 A  11/2012
(Continued)

OTHER PUBLICATIONS

Wever, D.A.Z. et al"Branched polyacrylamides: Synthesis and effect of molecular architecture on solution rheology", European Polymer Journal vol. 49 No. 10, Jul. 4, 2013.
Liao, Xin et al"A direct comparison of linear and star-shaped poly(dimethylaminoethyl acrylate) polymers for polyplexation with DNA and cytotoxicity in cultured cell lines", European Polymer Journal vol. 87, Aug. 26, 2016.

*Primary Examiner* — Karuna P Reddy
(74) *Attorney, Agent, or Firm* — Dierker & Kavanaugh, P.C.

(57) ABSTRACT

A hydrogel includes a dendritic core with 2 to 30 arms, and first and second acrylamide monomers incorporated into each arm. The first acrylamide monomer is: (I), wherein $R_1$ and $R_2$ are independently selected from an alkyl, an alkylamino, an alkylamido, an alkylthio, an aryl, a glycol, and optionally substituted variants thereof; and the second acrylamide monomer is: (II), wherein $R_3$ and $R_4$ are independently hydrogen or an alkyl; L is a linker including a linear chain of 2 to 20 atoms selected from carbon, oxygen, and nitrogen and optional substituents on the carbon and any nitrogen atoms; A is an N substituted amide: (III), where $R_5$ is hydrogen or an alkyl; E is a linear chain of 1 to 4 atom(s) selected from carbon, oxygen and nitrogen, and optional substituents on the carbon and any nitrogen atoms; and Z is an optional nitrogen containing heterocycle.

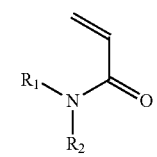

(I)

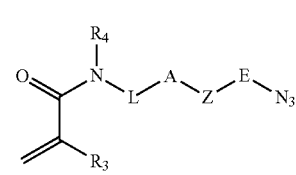

(II)

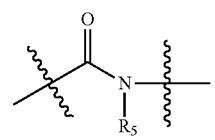

(III)

17 Claims, 9 Drawing Sheets

(56) References Cited

U.S. PATENT DOCUMENTS

| | | | |
|---|---|---|---|
| 2003/0181619 A1* | 9/2003 | Matyjaszewski | C08F 4/00 |
| | | | 526/341 |
| 2010/0318185 A1 | 12/2010 | Nunez et al. | |
| 2014/0243224 A1 | 8/2014 | Barnard et al. | |
| 2015/0266986 A1* | 9/2015 | Wang | A61L 26/008 |
| | | | 424/618 |
| 2016/0122816 A1* | 5/2016 | Brown | C08F 8/32 |
| | | | 526/306 |
| 2018/0155463 A1 | 6/2018 | Zhang et al. | |
| 2019/0256633 A1 | 8/2019 | Gao et al. | |
| 2020/0062871 A1* | 2/2020 | Johnson | C08F 293/005 |
| 2021/0061957 A1* | 3/2021 | Delaney, Jr. | C08G 77/045 |

FOREIGN PATENT DOCUMENTS

| | | |
|---|---|---|
| TW | 201809045 A | 3/2018 |
| TW | 201815855 A | 5/2018 |
| WO | 2016025747 A1 | 2/2016 |
| WO | 2016066586 A1 | 5/2016 |
| WO | 2019126040 A1 | 6/2019 |

* cited by examiner

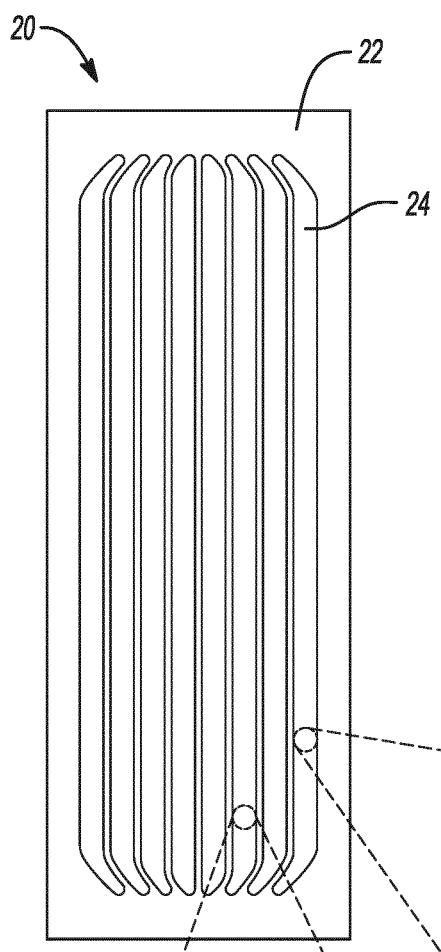
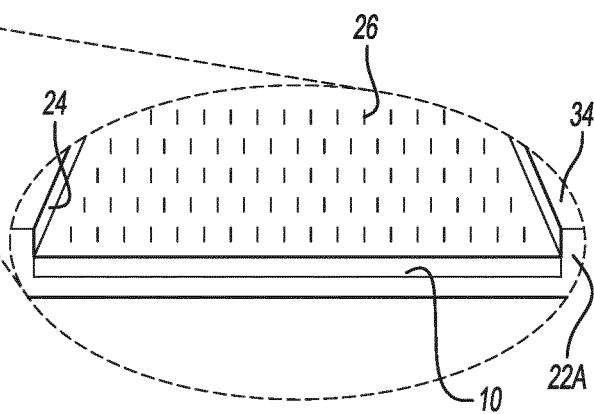
*Fig-2A*
*Fig-2B*
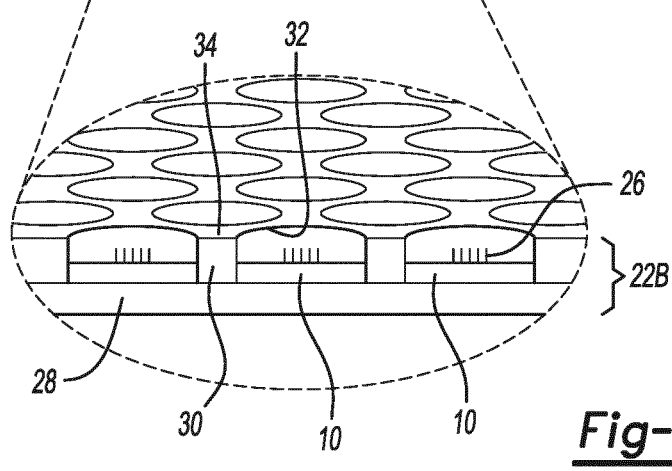
*Fig-2C*

HYDROGEL

CROSS-REFERENCE TO RELATED APPLICATIONS

This application claims the benefit of U.S. Provisional Application Ser. No. 62/942,52, filed Dec. 2, 2019, and Netherlands Application Serial Number N2024749, filed Jan. 24, 2020; the contents of each of which is incorporated by reference herein in its entirety.

BACKGROUND

Polymer or hydrogel-coated substrates are used in many technological applications. In one example, implantable medical devices can be coated with biologically inert polymers. In another example, a wound dressing may be coated with a thin hydrogel layer. In yet another example, polymer or hydrogel coated substrates may be used for the preparation and/or analysis of biological molecules. Some molecular analyses, such as certain nucleic acid sequencing methods, involve the attachment of nucleic acid strands to a polymer or hydrogel-coated surface of a substrate.

INTRODUCTION

Disclosed herein is a hydrogel comprising a dendritic core having from 2 arms to 30 arms, for example 2-20, or 2-10, a first acrylamide monomer incorporated into each arm of the dendritic core, the first acrylamide monomer having a structure:

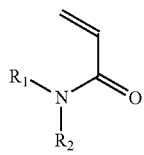

wherein $R_1$ and $R_2$ are independently selected from the group consisting of an alkyl, an alkylamino, an alkylamido, an alkylthio, an aryl, a glycol, and optionally substituted variants thereof, and a second acrylamide monomer incorporated into each arm of the dendritic core, the second acrylamide monomer having a structure:

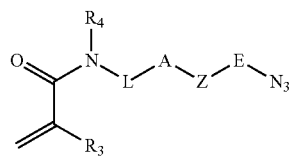

wherein $R_3$ is hydrogen or an alkyl; $R_4$ is hydrogen or an alkyl; L is a linker including a linear chain of 2 atoms to 20 atoms selected from the group consisting of carbon, oxygen, and nitrogen and optional substituents on the carbon and any nitrogen atoms in the chain; A is an N substituted amide having a structure

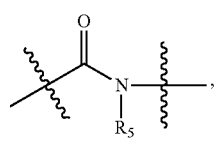

where $R_5$ is hydrogen or an alkyl; E is a linear chain of 1 atom to 4 atoms selected from the group consisting of carbon, oxygen and nitrogen, and optional substituents on the carbon and any nitrogen atoms in the chain; and Z is an optional nitrogen containing heterocycle.

The first acrylamide monomer can be N,N-dimethylacrylamide.

The dendritic core optionally contains a thiocarbonylthio group in each arm. The thiocarbonylthio group can be selected from the group consisting of a dithiobenzoate, a trithiocarbonate, and a dithiocarbamate. The dendritic core can be selected from the group consisting of 3,5-Bis(2-dodecylthiocarbonothioylthio-1-oxopropoxy)benzoic acid, 1,1,1-Tris[(dodecylthiocarbonothioylthio)-2-methylpropionate]ethane, and Pentaerythritol tetrakis[2-(dodecylthiocarbonothioylthio)-2-methylpropionate].

The dendritic core may include an atom transfer radical polymerization initiator in each arm. The dendritic core can be selected from the group consisting of Bis[2-(2'-bromoisobutyryloxy)ethyl]disulfide, 2-Bromoisobutyric anhydride, Ethylene bis(2-bromoisobutyrate), Pentaerythritol tetrakis(2-bromoisobutyrate), Dipentaerythritol hexakis(2-bromoisobutyrate), and 1,1,1-Tris(2-bromoisobutyryloxymethyl)ethane.

The dendritic core may include a multi-functional central molecule; and a plurality of atom transfer radical polymerization mono-initiators attached to the multi-functional central molecule. The atom transfer radical polymerization mono-initiator can be selected from the group consisting of 2-azidoethyl 2-bromoisobutyrate, poly(ethylene glycol) methyl ether 2-bromoisobutyrate, 2-(2-Bromoisobutyryloxy)ethyl methacrylate, Dodecyl 2-bromoisobutyrate, 2-Hydroxyethyl 2-bromoisobutyrate, 1-(Phthalimidomethyl) 2-bromoisobutyrate, and Propargyl 2-bromoisobutyrate.

The dendritic core can include a nitroxide mediated polymerization initiator in each arm. In a particular example, the dendritic core is selected from the group consisting of 1,3,5-tris((4-(1-((2,2,6,6-tetramethylpiperidin-1-yl)oxy)ethyl)benzyl)oxy)benzene and 1,3,5-tris((3,5-bis((4-(1-((2,2,6,6-tetramethylpiperidin-1-yl)oxy)ethyl)benzyl)oxy)benzyl)oxy)benzene.

The dendritic core can include: a multi-functional central molecule; and a plurality of nitroxide mediated polymerization mono-initiators attached to the multi-functional central molecule. Each of the plurality of nitroxide mediated polymerization mono-initiators can have a structure selected from the group consisting of:

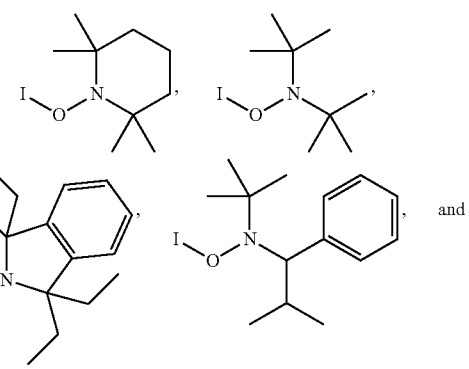

and

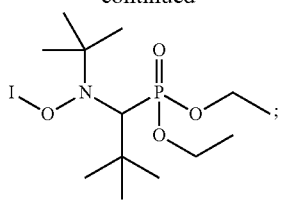

and wherein I is optionally selected from the group consisting of

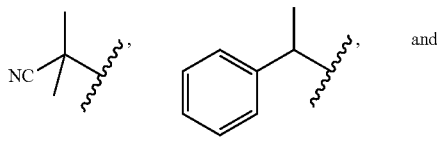

The first acrylamide monomer and the second acrylamide monomer can form a block copolymer, a random copolymer, a statistical copolymer, or an alternating copolymer in each arm of the dendritic core.

The second acrylamide monomer is optionally azido acetamido pentyl acrylamide.

It is to be understood that any features of the hydrogel disclosed herein may be combined together in any desirable manner and/or configuration to achieve the benefits as described in this disclosure, including, for example, to generate a polymeric hydrogel that exhibits suitable sequencing performance even after being exposed to dry storage at room temperature (e.g., from about 18° C. to about 25° C.).

Also disclosed is a flow cell comprising a substrate; a multi-arm polymeric hydrogel on the substrate, the multi-arm polymeric hydrogel including: a dendritic core having from 2 arms to 30 arms; a first acrylamide monomer incorporated into each arm of the dendritic core, the first acrylamide monomer having a structure:

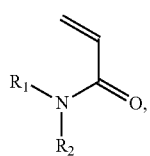

wherein $R_1$ and $R_2$ are independently selected from the group consisting of an alkyl, an alkylamino, an alkylamido, an alkylthio, an aryl, a glycol, and optionally substituted variants thereof, and a second acrylamide monomer incorporated into each arm of the dendritic core, the second acrylamide monomer having a structure:

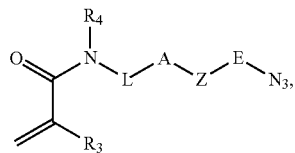

wherein $R_3$ is hydrogen or an alkyl; $R_4$ is hydrogen or an alkyl; L is a linker including a linear chain of 2 atoms to 20 atoms selected from the group consisting of carbon, oxygen, and nitrogen and optional substituents on the carbon and any nitrogen atoms in the chain; A is an N substituted amide having a structure

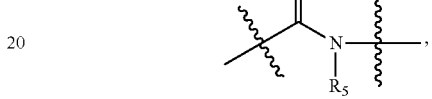

where $R_5$ is hydrogen or an alkyl; E is a linear chain of 1 atom to 4 atoms selected from the group consisting of carbon, oxygen and nitrogen, and optional substituents on the carbon and any nitrogen atoms in the chain; and Z is an optional nitrogen containing heterocycle.

The substrate optionally includes a plurality of depressions separated by interstitial regions, and wherein the hydrogel is positioned within each of the depressions.

The flow cell optionally further comprises amplification primers grafted to the hydrogel.

The substrate optionally includes a channel, wherein the hydrogel is optionally positioned in the channel. The flow cell further optionally comprises amplification primers grafted to the hydrogel.

The first acrylamide monomer and the second acrylamide monomer may form a random copolymer in each arm of the dendritic core; or the first acrylamide monomer and the second acrylamide monomer may form a statistical copolymer in each arm of the dendritic core; or the first acrylamide monomer and the second acrylamide monomer may form an alternating copolymer in each arm of the dendritic core; or the first acrylamide monomer and the second acrylamide monomer may form a block copolymer in each arm of the dendritic core.

The first acrylamide monomer is optionally N,N-dimethylacrylamide.

The second acrylamide monomer is optionally azido acetamido pentyl acrylamide.

It is to be understood that any features of the flow cell may be combined together in any desirable manner. Moreover, it is to be understood that any combination of features of the flow cell and/or of the hydrogel may be used together, and/or combined with any of the examples disclosed herein to achieve the benefits as described in this disclosure, including, for example, improved sequencing metrics.

Also disclosed herein is a method comprising incorporating a copolymer into each arm of a multi-arm dendritic core component having from 2 arms to 30 arms, wherein the copolymer includes a first acrylamide monomer and a second acrylamide monomer, and wherein: the first acrylamide monomer has a structure:

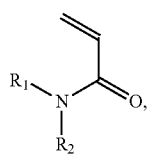

wherein $R_1$ and $R_2$ are independently selected from the group consisting of an alkyl, an alkylamino, an alkylamido, an alkylthio, an aryl, a glycol, and optionally substituted variants thereof; and the second acrylamide monomer has a structure:

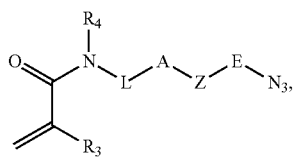

wherein $R_3$ is hydrogen or an alkyl; $R_4$ is hydrogen or an alkyl; L is a linker including a linear chain of 2 atoms to 20 atoms selected from the group consisting of carbon, oxygen, and nitrogen and optional substituents on the carbon and any nitrogen atoms in the chain; A is an N substituted amide having a structure

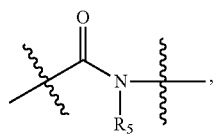

where $R_5$ is hydrogen or an alkyl; E is a linear chain of 1 atom to 4 atoms selected from the group consisting of carbon, oxygen and nitrogen, and optional substituents on the carbon and any nitrogen atoms in the chain; and Z is an optional nitrogen containing heterocycle.

The incorporating may involve polymerizing a mixture of the first acrylamide monomer and the second acrylamide monomer in the presence of the multi-arm component.

The incorporating may involve forming a block copolymer in the presence of the multi-arm component by: i) polymerizing a first block with the first acrylamide monomer in the presence of the multi-arm component to form a modified multi-arm component; and then polymerizing a second block with the second acrylamide monomer in the presence of the modified multi-arm component; or ii) polymerizing a first block with the second acrylamide monomer in the presence of the multi-arm component to form a modified multi-arm component; and then polymerizing a second block with the first acrylamide monomer in the presence of the modified multi-arm component.

The incorporating may involve reversible addition-fragmentation chain transfer polymerization or atom transfer radical polymerization or nitroxide mediated polymerization. The disclosure also refers to a wound dressing and a medical device comprising the hydrogel.

It is to be understood that any features of the method may be combined together in any desirable manner. Moreover, it is to be understood that any combination of features of the method and/or features of the flow cell and/or of the hydrogel may be used together, and/or combined with any of the examples disclosed herein to achieve the benefits as described in this disclosure, including, for example, controlling a molecular weight distribution of the hydrogel.

The disclosure also includes the following clauses:

1. A hydrogel, comprising:
a dendritic core having from 2 arms to 30 arms;
a first acrylamide monomer incorporated into each arm of the dendritic core, the first acrylamide monomer having a structure:

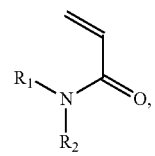

wherein $R_1$ and $R_2$ are independently selected from the group consisting of an alkyl, an alkylamino, an alkylamido, an alkylthio, an aryl, a glycol, and optionally substituted variants thereof, and
a second acrylamide monomer incorporated into each arm of the dendritic core, the second acrylamide monomer having a structure:

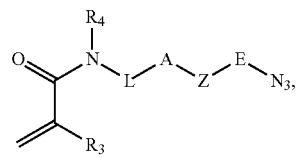

wherein $R_3$ is hydrogen or an alkyl; $R_4$ is hydrogen or an alkyl; L is a linker including a linear chain of 2 atoms to 20 atoms wherein each atom is independently selected from the group consisting of carbon, oxygen, and nitrogen and optional substituents on any carbon and any nitrogen atoms in the chain; A is an N substituted amide having a structure

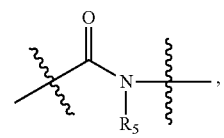

where $R_5$ is hydrogen or an alkyl; E is a linear chain of 1 atom to 4 atoms wherein each atom is independently selected from the group consisting of carbon, oxygen and nitrogen, and optional substituents on any carbon and any nitrogen atoms in the chain; and Z is an optional nitrogen containing heterocycle.

2. The hydrogel as defined in clause 1, wherein the first acrylamide monomer is N,N-dimethylacrylamide.

3. The hydrogel as defined in clause 1 or 2, wherein the dendritic core contains a thiocarbonylthio group in each arm.

4. The hydrogel as defined in clause 3, wherein the thiocarbonylthio group is selected from the group consisting of a dithiobenzoate, a trithiocarbonate, and a dithiocarbamate.

5. The hydrogel as defined in clause 3, wherein the dendritic core is selected from the group consisting of 3,5-Bis(2-dodecylthiocarbonothioylthio-1-oxopropoxy)

benzoic acid, 1,1,1-Tris[(dodecylthiocarbonothioylthio)-2-methylpropionate]ethane, and Pentaerythritol tetrakis[2-(dodecylthiocarbonothioylthio)-2-methylpropionate].

6. The hydrogel as defined in any of the preceding clauses, wherein the dendritic core includes an atom transfer radical polymerization initiator in each arm.

7. The hydrogel as defined in clause 6, wherein the dendritic core is selected from the group consisting of Bis[2-(2'-bromoisobutyryloxy)ethyl]disulfide, 2-Bromoisobutyric anhydride, Ethylene bis(2-bromoisobutyrate), Pentaerythritol tetrakis(2-bromoisobutyrate), Dipentaerythritol hexakis(2-bromoisobutyrate), and 1,1,1-Tris(2-bromoisobutyryloxymethyl)ethane.

8. The hydrogel as defined in any of the preceding clauses wherein the dendritic core includes:
    a multi-functional central molecule; and
    a plurality of atom transfer radical polymerization mono-initiators attached to the multi-functional central molecule.

9. The hydrogel as defined in clause 8, wherein the atom transfer radical polymerization mono-initiator is selected from the group consisting of 2-azidoethyl 2-bromoisobutyrate, poly(ethylene glycol) methyl ether 2-bromoisobutyrate, 2-(2-Bromoisobutyryloxy)ethyl methacrylate, Dodecyl 2-bromoisobutyrate, 2-Hydroxyethyl 2-bromoisobutyrate, 1-(Phthalimidomethyl) 2-bromoisobutyrate, and Propargyl 2-bromoisobutyrate.

10. The hydrogel as defined in any of the preceding clauses wherein the dendritic core includes a nitroxide mediated polymerization initiator in each arm.

11. The hydrogel as defined in clause 10, wherein the dendritic core is selected from the group consisting of 1,3,5-tris((4-(1-((2,2,6,6-tetramethylpiperidin-1-yl)oxy)ethyl)benzyl)oxy)benzene and 1,3,5-tris((3,5-bis((4-(1-((2,2,6,6-tetramethylpiperidin-1-yl)oxy)ethyl)benzyl)oxy)benzyl)oxy)benzene.

12. The hydrogel as defined in any of the preceding clauses wherein the dendritic core includes:
    a multi-functional central molecule; and
    a plurality nitroxide mediated polymerization mono-initiators attached to the multi-functional central molecule.

13. The hydrogel as defined in clause 12, wherein each of the plurality nitroxide mediated polymerization mono-initiators has a structure selected from the group consisting of:

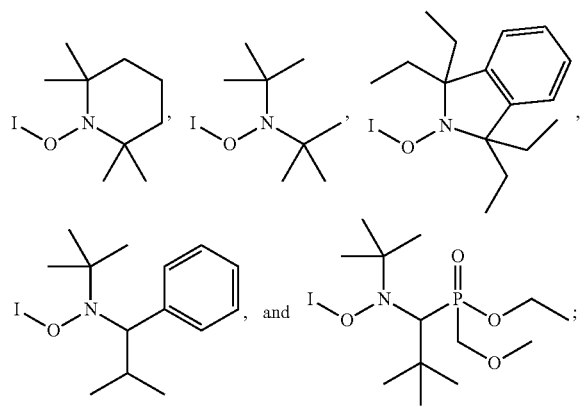

and wherein I is selected from the group consisting of

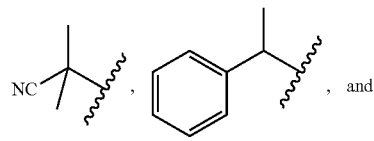

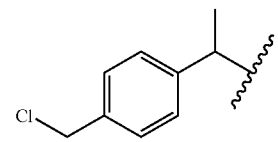

14. The hydrogel as defined in any of the preceding clauses, wherein the first acrylamide monomer and the second acrylamide monomer form a block copolymer, a random copolymer, a statistical copolymer, or an alternating copolymer in each arm of the dendritic core.

15. The hydrogel as defined in any of the preceding clauses wherein second acrylamide monomer is azido acetamido pentyl acrylamide.

16. A flow cell, comprising:
    a substrate; and
    a hydrogel according to any of the preceding clauses on the substrate.

17. The flow cell as defined in clause 16, wherein the substrate includes a plurality of depressions separated by interstitial regions, and wherein the hydrogel is positioned within each of the depressions.

18. The flow cell as defined in clause 16 or 17, further comprising amplification primers grafted to polymeric hydrogel.

19. The flow cell as defined in any of the clauses 16-18 wherein the substrate includes a channel, and wherein the hydrogel is positioned in the channel.

20. The flow cell as defined in any of the clauses 16-19 wherein:
    the first acrylamide monomer and the second acrylamide monomer form a random copolymer in each arm of the dendritic core; or
    the first acrylamide monomer and the second acrylamide monomer form a statistical copolymer in each arm of the dendritic core; or
    the first acrylamide monomer and the second acrylamide monomer form an alternating copolymer in each arm of the dendritic core; or
    the first acrylamide monomer and the second acrylamide monomer form a block copolymer in each arm of the dendritic core.

21. A method, comprising:
    incorporating a copolymer into each arm of a multi-arm dendritic core component having from 2 arms to 30 arms, wherein the copolymer includes a first acrylamide monomer and a second acrylamide monomer, and wherein:

the first acrylamide monomer has a structure:

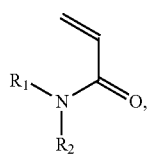

wherein R₁ and R₂ are independently selected from the group consisting of an alkyl, an alkylamino, an alkylamido, an alkylthio, an aryl, a glycol, and optionally substituted variants thereof; and the second acrylamide monomer has a structure:

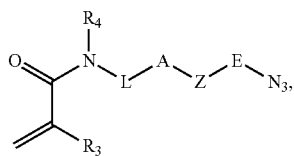

wherein $R_3$ is hydrogen or an alkyl; $R_4$ is hydrogen or an alkyl; L is a linker including a linear chain of 2 atoms to 20 atoms wherein each atom is independently selected from the group consisting of carbon, oxygen, and nitrogen and optional substituents on any carbon and any nitrogen atoms in the chain; A is an N substituted amide having a structure

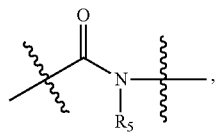

where $R_5$ is hydrogen or an alkyl; E is a linear chain of 1 atom to 4 atoms wherein each atom is independently selected from the group consisting of carbon, oxygen and nitrogen, and optional substituents on any carbon and any nitrogen atoms in the chain; and Z is an optional nitrogen containing heterocycle.

22. The method as defined in clause 21 wherein the incorporating involves polymerizing a mixture of the first acrylamide monomer and the second acrylamide monomer in the presence of the multi-arm component.

23. The method as defined in clause 21 or 22, wherein the incorporating involves forming a block copolymer in the presence of the multi-arm component by:

i) polymerizing a first block with the first acrylamide monomer in the presence of the multi-arm component to form a modified multi-arm component; and then polymerizing a second block with the second acrylamide monomer in the presence of the modified multi-arm component; or ii) polymerizing a first block with the second acrylamide monomer in the presence of the multi-arm component to form a modified multi-arm component; and then polymerizing a second block with the first acrylamide monomer in the presence of the modified multi-arm component.

24. The method as defined in any of the clauses 21-23 wherein the incorporating involves reversible addition-fragmentation chain transfer polymerization or atom transfer radical polymerization or nitroxide mediated polymerization.

25. A medical device coated with a hydrogel according to any of the clauses 1-15.

26. A wound dressing coated with a hydrogel according to any of the clauses 1-15.

27. A substrate coated with a hydrogel according to any of the clauses 1-15 for use in sequencing analysis.

28. The hydrogel according to any of the clauses 1-15 having the structure (10):

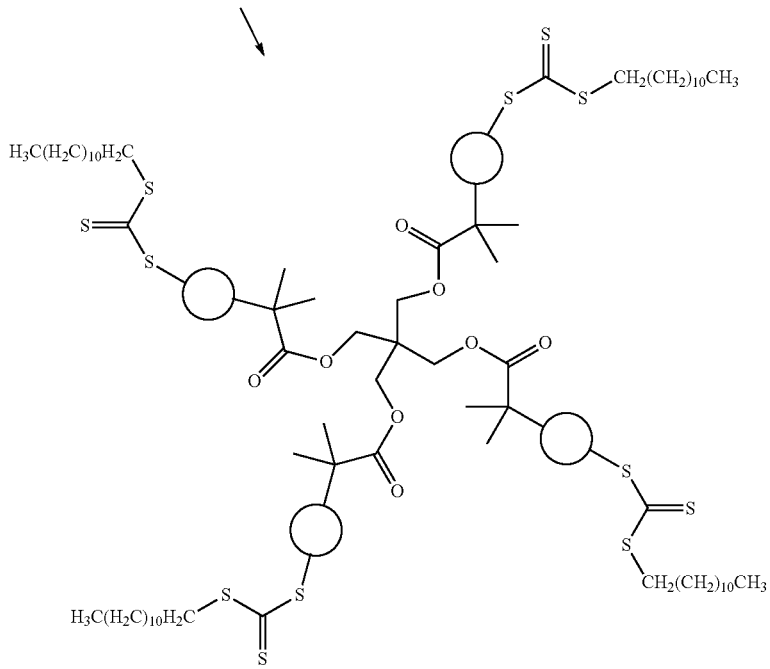

wherein:
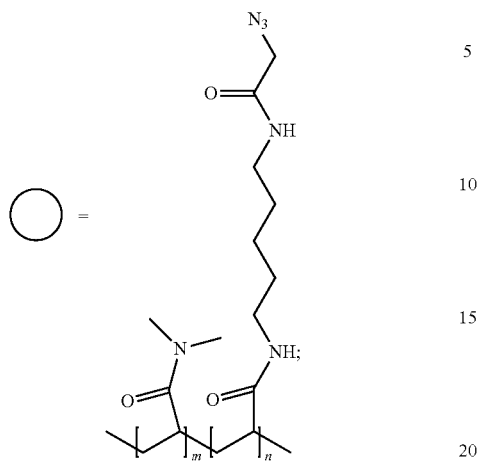
or the structure:
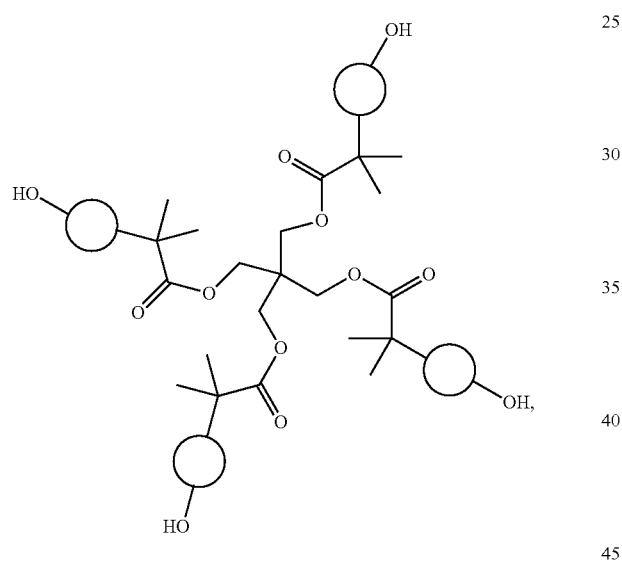
wherein:
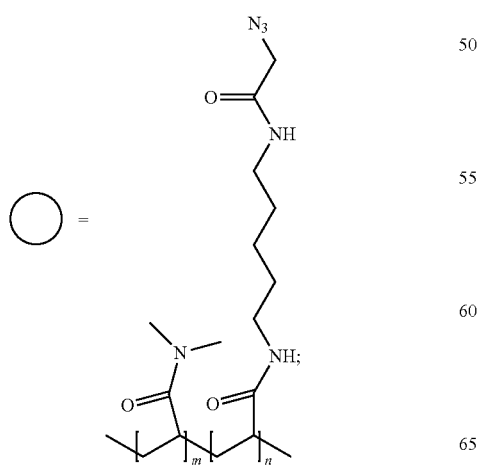

or the structure:

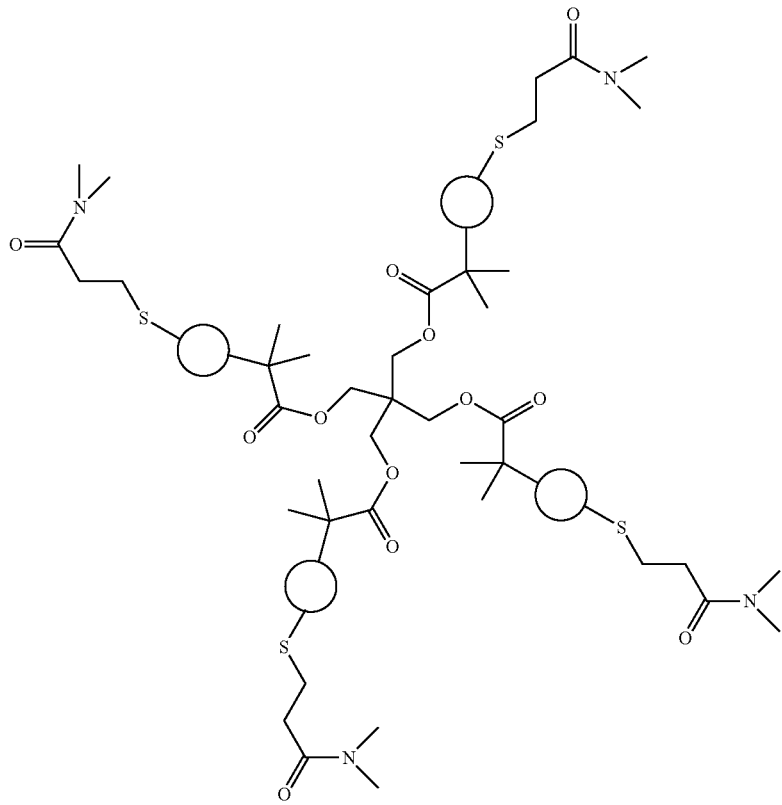

wherein:

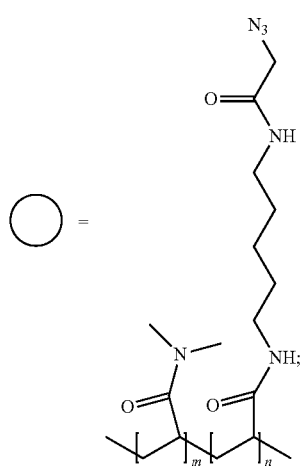

depicted in FIG. 1B or FIG. 1C in the description.

29. The hydrogel according to any of the clauses 1-15, 28 having a dispersity of lower than 2.5, in particular between 1.8 and 2.0, preferably lower than 1.7, more preferably lower than 1.3.

30. Hydrogel according to any of the clauses 1-15, wherein the dendritic core has a multi-functional central molecule selected from the group consisting of phenyl group, benzoic acid, pentaerythritol, and a phosphazene group.

31. Hydrogel according to any of the clauses 1-15, wherein the dendritic core has 2 arms, 3 arms, 4 arms, 6 arms or 8 arms.

32. The method as defined in any of the clauses 22-24 wherein the multi-arm component comprises a multi-functional central molecule and each arm thereof comprises a thiocarbonylthio group or an initiator selected from the group consisting of atom transfer radical polymerization (ATR) initiator and a nitroxide mediated polymerization mono-initiator.

33. The method as defined in any of the clauses 22-24, 32, wherein the second acrylamide monomer comprises an azide group, wherein the method additionally comprises at least one of:

attaching the multi-arm polymeric hydrogel to the surface of a substrate by reaction of an azide group of the formed multi-arm polymeric hydrogel;

attaching a primer to an arm of the multi-arm polymeric hydrogel by reaction of an azide group of the formed multi-arm polymeric hydrogel; and cross-linking of the formed multi-arm polymeric hydrogel 10 by reaction of an azide group of the formed multi-arm polymeric hydrogel.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 2A is a top view of an example of a flow cell;

FIG. 2B is an enlarged, and partially cutaway view of an example of a flow channel of the flow cell including an example of the multi-arm polymeric hydrogel positioned in the flow channel;

FIG. 2C is an enlarged, and partially cutaway view of an example of a flow channel of the flow cell including an example of the multi-arm polymeric hydrogel positioned in depressions formed in the flow channel;

DETAILED DESCRIPTION

Figure 1A:
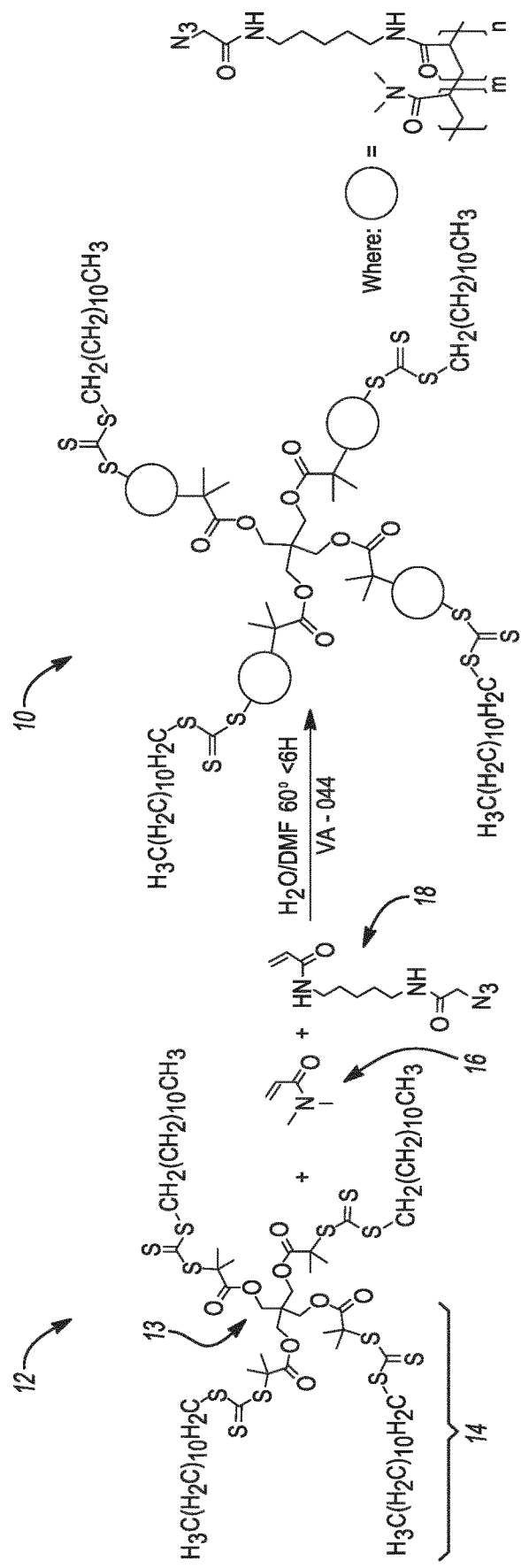
FIG. 1A is a chemical formula illustrating the formation of one example of a hydrogel, e.g., a multi-arm polymeric hydrogel.

A hydrogel is disclosed herein. One example of the hydrogel described herein is a polymeric hydrogel. The hydrogel disclosed herein may be a multi-arm polymeric hydrogel. Examples of the hydrogel include a dendrimeric core. During preparation of the hydrogel disclosed herein, the number of arms of the dendrimeric core may define the degree of branching of the polymer, hence providing control of the cross-linking. In other words, the cross-linking state of the hydrogel is fixed and constrained, depending upon the dendrimeric core that is used. Moreover, any cross-linking between branches may be adjusted through the monomer choice. The ability to adjust multiple parameters (e.g., initiator concentration, transfer agents, etc.) enables more control over dispersity (e.g., relative to a free radical polymerization process), and thus the resulting product has a relatively narrow molecular weight distribution (e.g., dispersity is less than or equal to 5, or in some instances, is ≤4, or ≤2.5, or ≤1.7, or ≤1.3). As such, the hydrogel can be consistently produced from one batch to the next batch. Dispersity as referred to in this invention is defined as the ratio between $M_w$ and $M_n$, wherein $M_w$ is the weight average molecular weight and $M_n$ is the number average molecular weight of the hydrogel. The $M_w$ and $M_n$ can be determined using Gel Permeation Chromotography.

Moreover, examples of the hydrogel exhibit suitable sequencing performance even after being exposed to dry storage at room temperature (e.g., from about 18° C. to about 25° C.). Undesirable intra-molecular and inter-molecular interactions of polymer strands, e.g., during dry storage, may deleteriously affect the downstream sequencing performance. In some implementations, the acrylamide unit of the hydrogels disclosed herein includes functional groups that may at least reduce hydrogen bonding between polymer strands, and thus may enable the hydrogel to be dry stored without having a negative effect on downstream sequencing performance.

Definitions

It is to be understood that terms used herein will take on their ordinary meaning in the relevant art unless specified otherwise. Several terms used herein and their meanings are set forth below.

The singular forms "a", "an", and "the" include plural referents unless the context clearly dictates otherwise.

The terms comprising, including, containing and various forms of these terms are synonymous with each other and are meant to be equally broad.

The terms top, bottom, lower, upper, on, etc. are used herein to describe the flow cell and/or the various components of the flow cell. It is to be understood that these directional terms are not meant to imply a specific orientation, but are used to designate relative orientation between components. The use of directional terms should not be interpreted to limit the examples disclosed herein to any specific orientation(s).

As used herein, "alkyl" refers to a straight or branched hydrocarbon chain that is fully saturated (i.e., contains no double or triple bonds). The alkyl group may have 1 to 20 carbon atoms. Example alkyl groups include methyl, ethyl, propyl, isopropyl, butyl, isobutyl, tertiary butyl, pentyl, hexyl, and the like. As an example, the designation "C1-C6 alkyl" indicates that there are one to six carbon atoms in the alkyl chain, i.e., the alkyl chain is selected from the group consisting of methyl, ethyl, propyl, iso-propyl, n-butyl, isobutyl, sec-butyl, t-butyl, pentyl, and hexyl.

As used herein, "alkylamino" refers to an alkyl group in which one or more of the hydrogen atoms are replaced by an amino group, where the amino group refers to an —$NR_aR_b$ group, where $R_a$ and $R_b$ are each independently selected from a C1-C6 alkyl, C2-C6 alkenyl, C2-C6 alkynyl, C3-C7 carbocycle, C6-C10 aryl, a 5-10 membered heteroaryl, and a 5-10 membered heterocycle.

As used herein, "alkylamido" refers to an alkyl group in which one or more of the hydrogen atoms are replaced by a C-amido group or an N-amido group. A "C-amido" group refers to a "—C(=O)N($R_aR_b$)" group in which $R_a$ and $R_b$ can independently be selected from the group consisting of alkyl, alkenyl, alkynyl, cycloalkyl, cycloalkenyl, cycloalkynyl, aryl, heteroaryl, heteroalicycle, aralkyl, or (heteroalicycle)alkyl. An "N-amido" group refers to a "RC(=O)N($R_a$)—" group in which R and $R_a$ can independently be selected from the group consisting of alkyl, alkenyl, alkynyl, cycloalkyl, cycloalkenyl, cycloalkynyl, aryl, heteroaryl, heteroalicycle, aralkyl, or (heteroalicycle)alkyl. Any alkylamido may be substituted or unsubstituted.

As used herein, "alkylthio" refers to RS—, in which R is an alkyl. The alkylthio can be substituted or unsubstituted.

As used herein, "alkenyl" refers to a straight or branched hydrocarbon chain containing one or more double bonds. The alkenyl group may have 2 to 20 carbon atoms. Example alkenyl groups include ethenyl, propenyl, butenyl, pentenyl, hexenyl, and the like.

As used herein, "alkyne" or "alkynyl" refers to a straight or branched hydrocarbon chain containing one or more triple bonds. The alkynyl group may have 2 to 20 carbon atoms.

As used herein, "aralkyl" and "aryl(alkyl)" refer to an aryl group connected, as a substituent, via a lower alkylene group. The lower alkylene and aryl group of an aralkyl may be substituted or unsubstituted. Examples include but are not limited to benzyl, 2-phenylalkyl, 3-phenylalkyl, and naphthylalkyl.

The term "aryl" refers to an aromatic ring or ring system (i.e., two or more fused rings that share two adjacent carbon atoms) containing only carbon in the ring backbone. When the aryl is a ring system, every ring in the system is aromatic. The aryl group may have 6 to 18 carbon atoms. Examples of aryl groups include phenyl, naphthyl, azulenyl, and anthracenyl. Any aryl may be a heteroaryl, with at least one heteroatom, that is, an element other than carbon (e.g., nitrogen, oxygen, sulfur, etc.), in ring backbone.

As used herein, the term "attached" refers to the state of two things being joined, fastened, adhered, connected or bound to each other, either directly or indirectly. For example, a nucleic acid can be attached to a functionalized polymer by a covalent or non-covalent bond. A covalent bond is characterized by the sharing of pairs of electrons between atoms. A non-covalent bond is a physical bond that does not involve the sharing of pairs of electrons and can include, for example, hydrogen bonds, ionic bonds, van der Waals forces, hydrophilic interactions and hydrophobic interactions.

An "azide" or "azido" functional group refers to —$N_3$.

A "block copolymer" is a copolymer formed when two or more monomers cluster together and form blocks of repeating units. Each block should have at least one feature which is/are not present in adjacent blocks. Specific examples of block copolymers will be described further below.

As used herein, "carbocycle" means a non-aromatic cyclic ring or ring system containing only carbon atoms in the ring system backbone. When the carbocycle is a ring system, two or more rings may be joined together in a fused, bridged or spiro-connected fashion. Carbocycles may have any degree of saturation, provided that at least one ring in a ring system is not aromatic. Thus, carbocycles include cycloalkyls, cycloalkenyls, and cycloalkynyls. The carbocycle group may have 3 to 20 carbon atoms. Examples of carbocycle rings include cyclopropyl, cyclobutyl, cyclopentyl, cyclohexyl, cyclohexenyl, 2,3-dihydro-indene, bicyclo[2.2.2]octanyl, adamantyl, and spiro[4.4]nonanyl. Any of the carbocycles may be heterocycles, with at least one heteroatom in ring backbone.

As used herein, "cycloalkyl" refers to a completely saturated (no double or triple bonds) mono- or multi-cyclic hydrocarbon ring system. When composed of two or more rings, the rings may be joined together in a fused fashion. Cycloalkyl groups can contain 3 to 10 atoms in the ring(s). In some examples, cycloalkyl groups can contain 3 to 8 atoms in the ring(s). A cycloalkyl group may be unsubstituted or substituted. Example cycloalkyl groups include cyclopropyl, cyclobutyl, cyclopentyl, cyclohexyl, cycloheptyl, and cyclooctyl.

As used herein, "cycloalkenyl" or "cycloalkene" means a carbocycle ring or ring system having at least one double bond, wherein no ring in the ring system is aromatic. Examples include cyclohexenyl or cyclohexene and norbornenyl or norbornene.

As used herein, "cycloalkynyl" or "cycloalkyne" means a carbocycle ring or ring system having at least one triple bond, wherein no ring in the ring system is aromatic. An example is cyclooctyne. Another example is bicyclononyne.

"Dendritic core" as used herein refers to the center of the hydrogel. The dendritic core is a synthetic polymer with a branching, and in some instances treelike, structure. The dendritic core can have anywhere from 2 arms (branches) to 30 arms.

The term "depositing," as used herein, refers to any suitable application technique, which may be manual or automated, and, in some instances, results in modification of the surface properties. Generally, depositing may be performed using vapor deposition techniques, coating techniques, grafting techniques, or the like. Some specific examples include chemical vapor deposition (CVD), spray coating (e.g., ultrasonic spray coating), spin coating, dunk or dip coating, doctor blade coating, puddle dispensing, flow through coating, aerosol printing, screen printing, microcontact printing, inkjet printing, or the like.

As used herein, the term "depression" refers to a discrete concave feature in a substrate or a patterned resin having a surface opening that is at least partially surrounded by interstitial region(s) of the substrate or the patterned resin. Depressions can have any of a variety of shapes at their opening in a surface including, as examples, round, elliptical, square, polygonal, star shaped (with any number of vertices), etc. The cross-section of a depression taken orthogonally with the surface can be curved, square, polygonal, hyperbolic, conical, angular, etc. As examples, the depression can be a well or two interconnected wells. The depression may also have more complex architectures, such as ridges, step features, etc.

The term "each," when used in reference to a collection of items, is intended to identify an individual item in the collection, but does not necessarily refer to every item in the collection. Exceptions can occur if explicit disclosure or context clearly dictates otherwise.

As used herein, the term "flow cell" is intended to mean a vessel having a chamber (e.g., a flow channel) where a reaction can be carried out, an inlet for delivering reagent(s) to the chamber, and an outlet for removing reagent(s) from the chamber. In some examples, the chamber enables the detection of the reaction that occurs in the chamber. For example, the chamber can include one or more transparent surfaces allowing for the optical detection of arrays, optically labeled molecules, or the like.

As used herein, a "flow channel" or "channel" may be an area defined between two bonded components, which can selectively receive a liquid sample. In some examples, the flow channel may be defined between a patterned or non-patterned substrate and a lid, and thus may be in fluid communication with one or more depressions defined in the patterned resin. The flow channel may also be defined between two patterned or non-patterned substrate surfaces that are bonded together.

As used herein, "heteroalicyclic" or "heteroalicycle" refers to three-, four-, five-, six-, seven-, eight-, nine-, ten-, up to 18-membered monocyclic, bicyclic, and tricyclic ring system wherein carbon atoms together with from 1 to 5 heteroatoms constitute said ring system. A heteroalicyclic ring system may optionally contain one or more unsaturated bonds situated in such a way, however, that a fully delocalized pi-electron system does not occur throughout all the rings. The heteroatoms are independently selected from oxygen, sulfur, and nitrogen. A heteroalicyclic ring system may further contain one or more carbonyl or thiocarbonyl functionalities, so as to make the definition include oxo-systems and thio-systems such as lactams, lactones, cyclic imides, cyclic thioimides, and cyclic carbamates. The rings may be joined together in a fused fashion. Additionally, any nitrogens in a heteroalicyclic may be quaternized. Heteroalicycle or heteroalicyclic groups may be unsubstituted or substituted. Examples of such "heteroalicyclic" or "heteroalicycle" groups include 1,3-dioxin, 1,3-dioxane, 1,4-dioxane, 1,2-dioxolane, 1,3-dioxolane, 1,4-dioxolane, 1,3-oxathiane, 1,4-oxathiin, 1,3-oxathiolane, 1,3-dithiole, 1,3-dithiolane, 1,4-oxathiane, tetrahydro-1,4-thiazine, 2H-1,2-oxazine, maleimide, succinimide, barbituric acid, thiobarbituric acid, dioxopiperazine, hydantoin, dihydrouracil, trioxane, hexahydro-1,3,5-triazine, imidazoline, imidazolidine, isoxazoline, isoxazolidine, oxazoline, oxazolidine, oxazolidinone, thiazoline, thiazolidine, morpholine, oxirane, piperidine N-oxide, piperidine, piperazine, pyrrolidine, pyrrolidone, pyrrolidione, 4-piperidone, pyrazoline, pyrazolidine, 2-oxopyrrolidine, tetrahydropyran, 4H-pyran, tetrahydrothiopyran, thiamorpholine, thiamorpholine sulfoxide, thiamorpholine sulfone, and their benzo-fused analogs (e.g., benzimidazolidinone, tetrahydroquinoline, 3,4-methylenedioxyphenyl).

As used herein, "heteroaralkyl" and "heteroaryl(alkyl)" refer to a heteroaryl group connected, as a substituent, via a lower alkylene group. The lower alkylene and heteroaryl group of heteroaralkyl may be substituted or unsubstituted. Examples include 2-thienylalkyl, 3-thienylalkyl, furylalkyl, thienylalkyl, pyrrolylalkyl, pyridylalkyl, isoxazolylalkyl, and imidazolylalkyl, and their benzo-fused analogs.

A "(heteroalicyclic)alkyl" refers to a heterocyclic or a heteroalicyclic group connected, as a substituent, via a lower alkylene group. The lower alkylene and heterocycle or a heterocycle of a (heteroalicyclic)alkyl may be substituted or unsubstituted. Examples include but are not limited tetrahydro-2H-pyran-4-yl)methyl, (piperidin-4-yl)ethyl, (piperidin-4-yl)propyl, (tetrahydro-2H-thiopyran-4-yl)methyl, and (1,3-thiazinan-4-yl)methyl.

As used herein, "hydroxy" or "hydroxyl" refers to an —OH group.

The term "gycol" refers to the end group —$(CH_2)_n$OH, where n ranges from 2 to 10. As specific examples, the glycol may be an ethylene glycol end group —$CH_2CH_2OH$, a propylene glycol end group —$CH_2CH_2CH_2OH$, or a butylene glycol end group —$CH_2CH_2CH_2CH_2OH$.

As used herein, the term "interstitial region" refers to an area, e.g., of a substrate, patterned resin, or other support that separates depressions. For example, an interstitial region can separate one depression of an array from another depression of the array. The two depressions that are separated from each other can be discrete, i.e., lacking physical contact with each other. In many examples, the interstitial region is continuous whereas the depressions are discrete, for example, as is the case for a plurality of depressions defined in an otherwise continuous surface. In other examples, the interstitial regions and the features are discrete, for example, as is the case for a plurality of trenches separated by respective interstitial regions. The separation provided by an interstitial region can be partial or full separation. Interstitial regions may have a surface material that differs from the surface material of the depressions defined in the surface. For example, depressions can have a polymer and a first primer set therein, and the interstitial regions can have a polymer and a second primer set thereon. For another example, depressions of an array can have beads therein while the interstitial regions do not have beads thereon.

As used herein, a "nucleotide" includes a nitrogen containing heterocyclic base, a sugar, and one or more phosphate groups. Nucleotides are monomeric units of a nucleic acid sequence. In ribonucleic acids RNA, the sugar is a ribose, and in deoxyribonucleic acids DNA, the sugar is a deoxyribose, i.e. a sugar lacking a hydroxyl group that is present at the 2' position in ribose. The nitrogen containing heterocyclic base (i.e., nucleobase) can be a purine base or a pyrimidine base. Purine bases include adenine (A) and guanine (G), and modified derivatives or analogs thereof. Pyrimidine bases include cytosine (C), thymine (T), and uracil (U), and modified derivatives or analogs thereof. The C-1 atom of deoxyribose is bonded to N-1 of a pyrimidine or N-9 of a purine. A nucleic acid analog may have any of the phosphate backbone, the sugar, or the nucleobase altered. Examples of nucleic acid analogs include, for example, universal bases or phosphate-sugar backbone analogs, such as peptide nucleic acid (PNA).

A "patterned resin" refers to any polymer that can have depressions defined therein. Specific examples of resins and techniques for patterning the resins will be described further herein.

As used herein, the "primer" is defined as a single stranded nucleic acid sequence (e.g., single strand DNA or single strand RNA). Some primers, referred to herein as amplification primers, serve as a starting point for template amplification and cluster generation. Other primers, referred to herein as sequencing primers, serve as a starting point for DNA or RNA synthesis. The 5' terminus of the primer may be modified to allow a coupling reaction with a functional group of a polymer or with a bead surface. The primer length can be any number of bases long and can include a variety of non-natural nucleotides. In an example, the sequencing primer is a short strand, ranging from 10 to 60 bases, or from 20 to 40 bases.

The term "substrate" refers to a structure upon which various components of the flow cell (e.g., the hydrogel, primer(s), etc.) may be added. The substrate may be a wafer, a panel, a rectangular sheet, a die, or any other suitable configuration. The substrate is generally rigid and is insoluble in an aqueous liquid. The substrate may be inert to a chemistry that is used to modify the depressions or that is present in the depressions. For example, a substrate can be inert to chemistry used to form the polymer, to attach the primer(s), etc. The substrate may be a single layer structure, or a multi-layered structure (e.g., including a support and a patterned resin on the support). Examples of suitable substrates will be described further herein.

Multi-Arm Polymeric Hydrogel

One example of the hydrogel described herein is a multi-arm polymeric hydrogel. The multi-arm polymeric hydrogel includes a dendritic core having from 2 arms to 30 arms; a first acrylamide monomer incorporated into each arm of the dendritic core, the first acrylamide monomer having a structure:

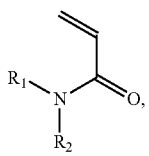

wherein $R_1$ and $R_2$ are independently selected from the group consisting of an alkyl, an alkylamino, an alkylamido, an alkylthiol, an aryl, a glycol, and optionally substituted variants thereof, and a second acrylamide monomer incorporated into each arm of the dendritic core, the second acrylamide monomer having a structure:

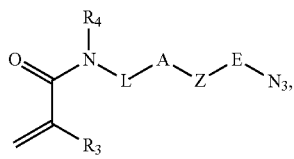

wherein $R_3$ is hydrogen or an alkyl; $R_4$ is hydrogen or an alkyl; L is a linker including a linear chain of 2 atoms to 20 atoms selected from the group consisting of carbon, oxygen, and nitrogen and optional substituents on the carbon and any nitrogen atoms in the chain; A is an N substituted amide having a structure

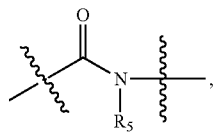

where $R_5$ is hydrogen or an alkyl; E is a linear chain of 1 atom to 4 atoms selected from the group consisting of carbon, oxygen and nitrogen, and optional substituents on the carbon and any nitrogen atoms in the chain; and Z is an optional nitrogen containing heterocycle.

The multi-arm polymeric hydrogel may be prepared by incorporating a copolymer into each arm of a multi-arm component having from 2 arms to 30 arms, wherein the copolymer includes the first acrylamide monomer and the second acrylamide monomer. The incorporation of the acrylamide monomers into the multi-arm component may be statistical, random, alternating, or in block. The incorporation of the acrylamide monomers into the multi-arm component may be accomplished by a variety of techniques including reversible addition-fragmentation chain transfer (RAFT) polymerization, atom transfer radical polymerization (ATRP), nitroxide mediated radical (NMP) polymerization in combination with RAFT or ATRP, NMP with an additional cross-linking step, cobalt-mediated polymerization, group transfer polymerization (GTP), ring opening polymerization (ROP), or any other polymerization process that either directly or indirectly yields the multi-arm architecture and the incorporation of the acrylamide monomers (statistically, randomly, alternatingly, or in block) into each arm. As one example of an indirect process, NMP may be followed by RAFT polymerization.

FIG. 1A depicts an example of RAFT polymerization to generate one example of the hydrogel, which in this example is a multi-arm polymeric hydrogel 10.

In the example shown in FIG. 1A, the dendritic core 12 includes a central molecule/compound 13 and arms 14 (or branches) that extend from the central molecule/compound 13. The dendritic core 12 may be any multi-functional component that enables a controlled polymerization mechanism, which leads to a defined arm length in the polymer structure and an at least substantially uniform arm length between polymer structures. In an example, the arms of the dendritic core 12 are identical to each other.

The central molecule/compound 13 of the dendritic core 12 may be any multi-functional molecule, such as macrocycles (e.g., cyclodextrins, porphyrins, etc.), extended pi-systems (e.g., perylenes, fullerenes, etc.), metal-ligand complexes, polymeric cores, etc. Some specific examples of the central molecule/compound 13 of the dendritic core 12 include a phenyl group, benzoic acid, pentaerythritol, a phosphazene group, etc.

As mentioned, the dendritic core 12 includes arms 14 that extend from the central molecule/compound 13.

In one example, the dendritic core 12 contains a thiocarbonylthio group in each arm 12, and thus is a reversible addition-fragmentation chain transfer agent (a RAFT agent). This example of the dendritic core 12 may have from 2 arms to 30 arms, each of which includes the thiocarbonylthio groups at or near the end of each arm. In some examples, the dendritic core 12 including the thiocarbonylthio groups has 2 arms, 3 arms, 4 arms, 6 arms, or 8 arms.

Each RAFT agent includes the thiocarbonylthio group (S═C—S) with substituents R and Z that impact the polymerization reaction kinetics and the degree of structural control. As examples, the thiocarbonylthio group in each arm 14 of the dendritic core 12 may be selected from the group consisting of a dithiobenzoate:

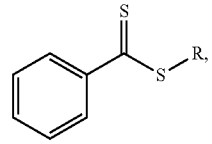

a trithiocarbonate:

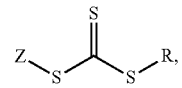

and a dithiocarbamate:

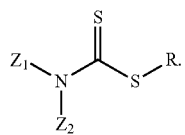

The dendritic core 12 shown in FIG. 1A includes a trithiocarbonate group in each arm 14.

The R-group in the RAFT agent is a free radical leaving group, and the Z-group(s) control C=S bond reactivity and influence the rate of radical addition and fragmentation.

In some examples, the dendritic core 12 including the thiocarbonylthio group in each arm 14 has an R-group configuration, where the central molecule 13 is the leaving group during the chain transfer process. Two examples of the dendritic core having the R-group RAFT agent configuration are:

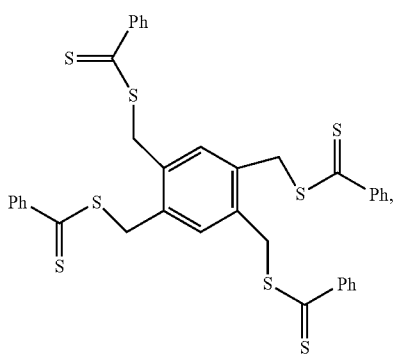

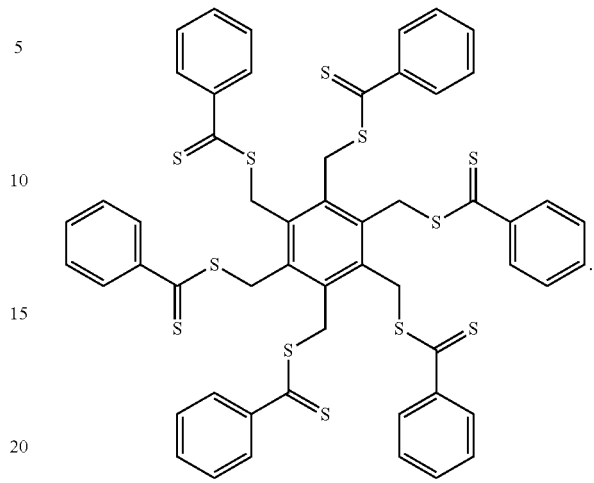

where Ph is a phenyl group, and

In other examples, the dendritic core 12 including the thiocarbonylthio group in each arm 14 has a Z-group configuration. In these examples, the reactive polymeric arms 14 are detached from the central molecule/compound 13 during growth, and to undergo chain transfer, again react at the central molecule/compound 13. One example of the dendritic core having a Z-group RAFT configuration is:

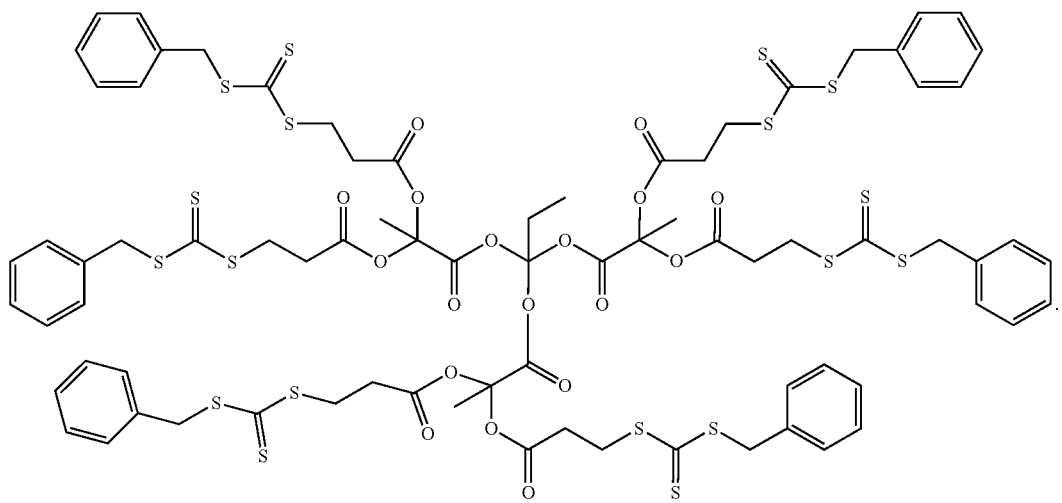 [SMILES: CCC(OC(=O)C(C)(OC(=O)CCSC(=S)SCc1ccccc1)OC(=O)CCSC(=S)SCc1ccccc1)(OC(=O)C(C)(OC(=O)CCSC(=S)SCc1ccccc1)OC(=O)CCSC(=S)SCc1ccccc1)OC(=O)C(C)(OC(=O)CCSC(=S)SCc1ccccc1)OC(=O)CCSC(=S)SCc1ccccc1]

In an example, the dendritic core 12 including the thiocarbonylthio group in each arm 14 is selected from the group consisting of 3,5-Bis(2-dodecylthiocarbonothioylthio-1-oxopropoxy)benzoic acid:

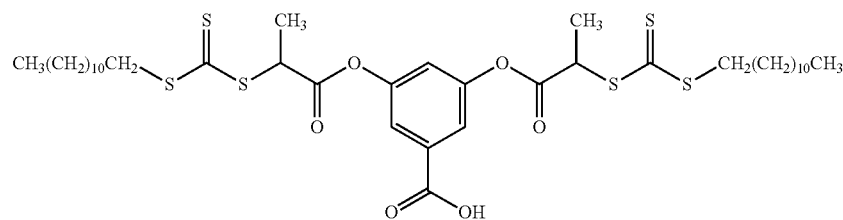

(an example of a 2-arm dendritic core); 1,1,1-Tris[(dodecyl-thiocarbonothioylthio)-2-methylpropionate]ethane:
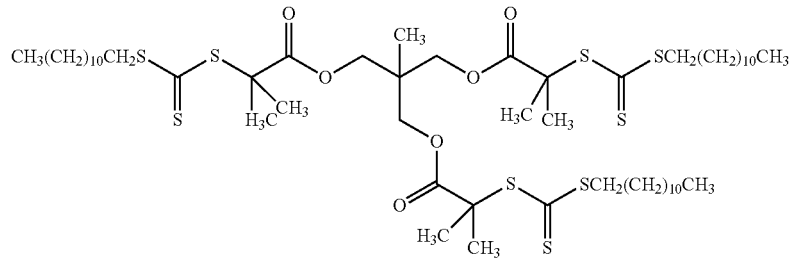
(an example of a 3-arm dendritic core); and Pentaerythritol tetrakis[2-(dodecylthiocarbonothioylthio)-2-methylpropionate]:
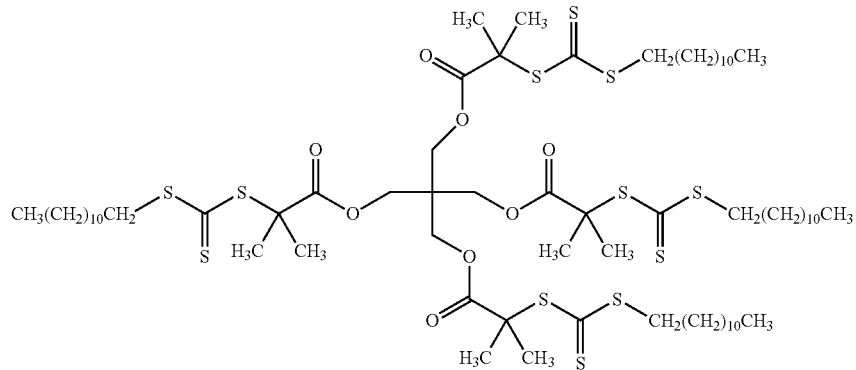
(an example of a 4-arm dendritic core).
An example of the dendritic core 12 including a phosphazene ring as the central molecule/compound 13 is:
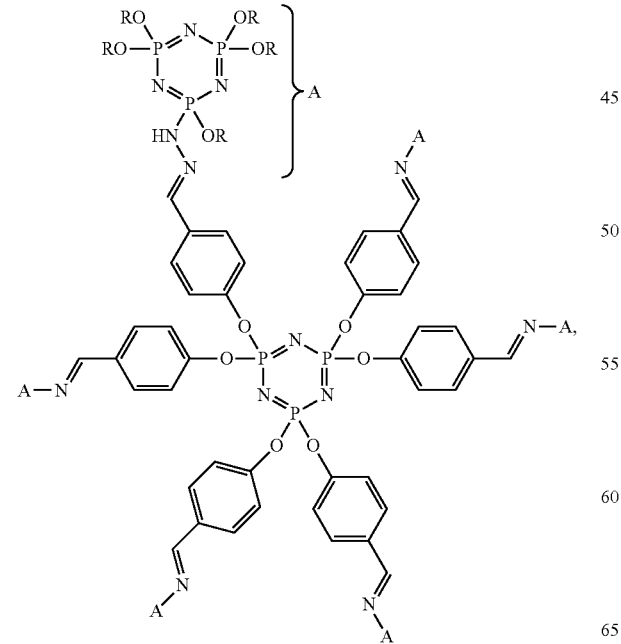

where each R is a trithiocarbonyl group. This is one example of dendritic core 12 including 30 arms.

Still another example of the dendritic core 12 including the thiocarbonylthio group in each arm 14 can be generated through the RAFT polymerization of acrylamide with N,N'-methylenebis(acrylamide) (BisAM) as a cross-linker with 3-(((Benzylthio)carbonothioyl)thio)propanoic acid, followed by chain extension with different levels of acrylamide.

In another example, the dendritic core 12 includes an atom transfer radical polymerization (ATRP) initiator in each arm 14. This example dendritic core 12 may have from 2 arms to 30 arms, each of which includes the ATRP initiator at or near the end of each arm 14. In some examples, the dendritic core including the ATRP initiator has 2 arms, 3 arms, 4 arms, 6 arms, or 8 arms.

In some examples, the dendritic core 12 including the atom transfer radical polymerization (ATRP) initiator is a multi-functional initiator. In these examples, the dendritic core 12 may be selected from the group consisting of Bis[2-(2'-bromoisobutyryloxy)ethyl]disulfide, 2-Bromoisobutyric anhydride, Ethylene bis(2-bromoisobutyrate), Pentaerythritol tetrakis(2-bromoisobutyrate), Dipentaerythritol hexakis(2-bromoisobutyrate), and 1,1,1-Tris(2-bromoisobutyryloxymethyl)ethane.

In other examples, mono-functional initiators are attached to a non-ATRP multi-functional central molecule to generate the dendritic core 12 including the atom transfer radical polymerization (ATRP) initiator in each arm. The non-ATRP multi-functional central molecule may be any example of the multi-functional central molecule 13 set forth herein.

Examples of the ATRP mono-initiators include 2-azidoethyl 2-bromoisobutyrate, poly(ethylene glycol) methyl ether 2-bromoisobutyrate (of varying molecular weights), 2-(2-Bromoisobutyryloxy)ethyl methacrylate, Dodecyl 2-bromoisobutyrate, 2-Hydroxyethyl 2-bromoisobutyrate, 1-(Phthalimidomethyl) 2-bromoisobutyrate, Propargyl 2-bromoisobutyrate, or the like. These mono-initiators may be attached to any example of the central molecules/compounds 13 disclosed herein to form the dendritic core 12 including the atom transfer radical polymerization (ATRP) initiator in each arm.

In still another example, the dendritic core 12 includes a nitroxide (aminooxyl) mediated polymerization (NMP) initiator in each arm 14. This example dendritic core may have from 2 arms to 30 arms, each of which includes the NMP initiator at or near the end of each arm 14. In some examples, the dendritic core including the NMP initiator has 2 arms, 3 arms, 4 arms, 6 arms, or 8 arms.

In some examples, the dendritic core 12 including the NMP initiator is a multi-functional initiator. As example, the multi-functional initiator (1) may be:

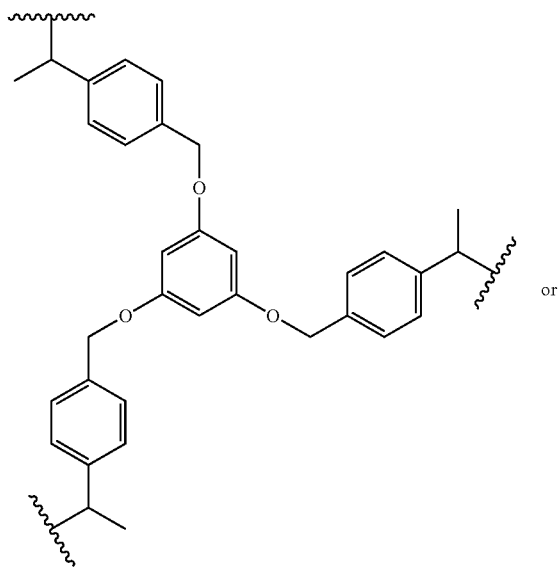 or

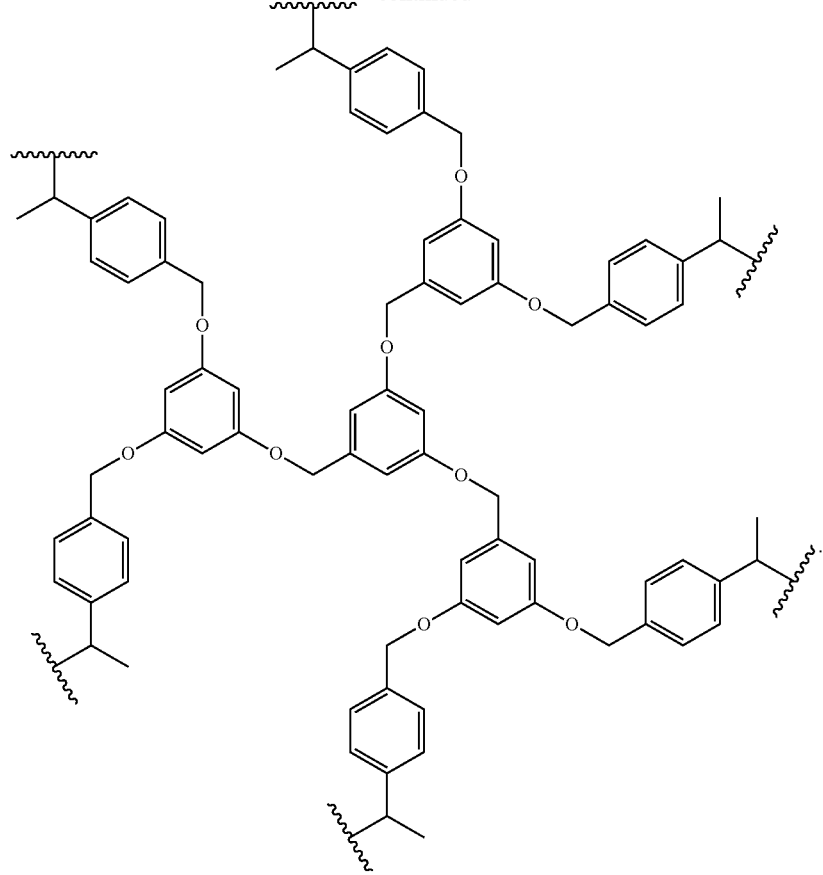

Different nitroxide end group(s) may be attached to each arm of these initiators, such as 2,2,6,6-Tetramethylpiperidin-1-yl)oxyl (TEMPO):

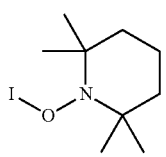

(where I is the multi-functional initiator), di-t-butyl nitroxide:

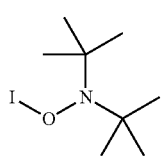

(where I is the multi-functional initiator), 1,1,3,3-tetraethylisoindolin-N-oxyl tetraethylisoindoline nitroxide:

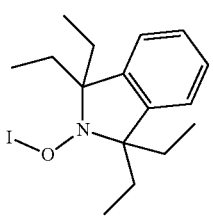 [SMILES: CCC1(CC)c2ccccc2C(CC)(CC)N1OI]

(where I is the multi-functional initiator), 2,2,5-Trimethyl-4-phenyl-3-azahexane-3-nitroxide (TIPNO):

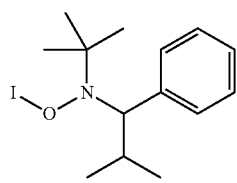 [SMILES: CC(C)C(c1ccccc1)N(OI)C(C)(C)C]

(where I is the multi-functional initiator), N-tert-butyl-N-[1-diethylphosphono-(2,2-dimethylpropyl)]nitroxide (SG1):

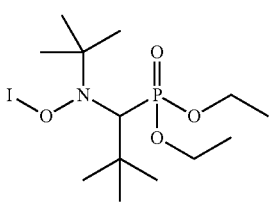 [SMILES: CCOP(=O)(OCC)C(N(OI)C(C)(C)C)C(C)(C)C]

(where I is the multi-functional initiator). In an example, the dendritic core 12 may be selected from the group consisting of 1,3,5-tris((4-(1-((2,2,6,6-tetramethylpiperidin-1-yl)oxy)ethyl)benzyl)oxy)benzene:

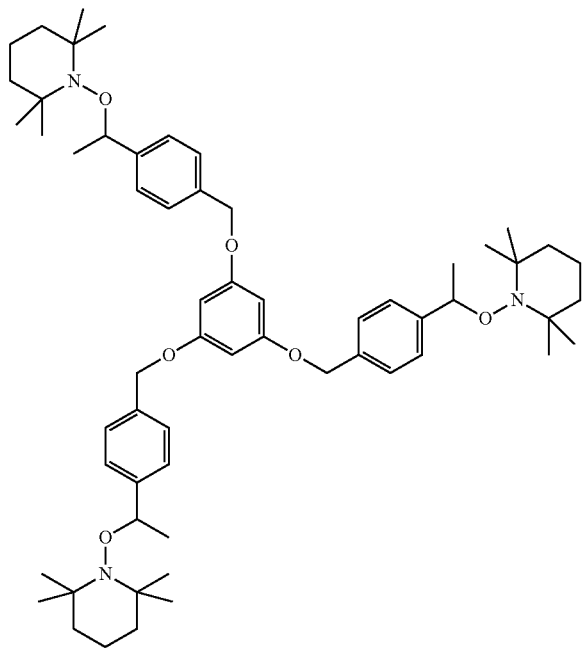 [SMILES: CC(ON1C(C)(C)CCCC1(C)C)c1ccc(COc2cc(OCc3ccc(C(C)ON4C(C)(C)CCCC4(C)C)cc3)cc(OCc3ccc(C(C)ON4C(C)(C)CCCC4(C)C)cc3)c2)cc1]

and 1,3,5-tris((3,5-bis((4-(1-((2,2,6,6-tetramethylpiperidin-1-yl)oxy)ethyl)benzyl)oxy)benzyl)oxy)benzene:

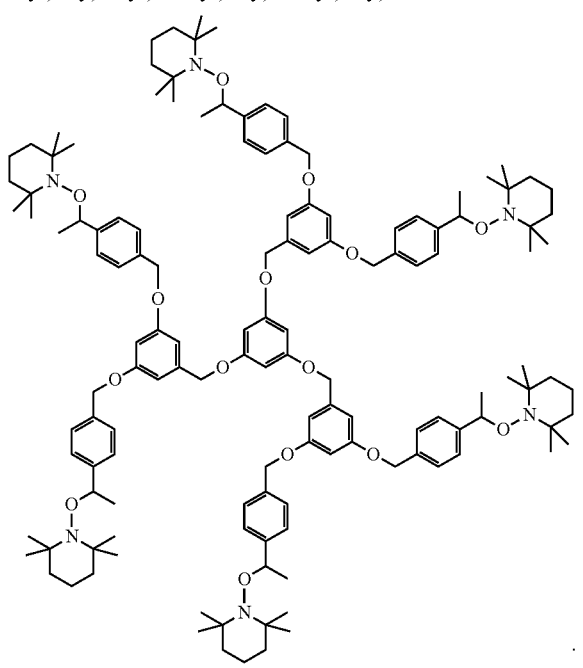

In other examples, a plurality of mono-functional NMP initiators is attached to a non-NMP multi-functional central molecule to generate the dendritic core 12 including the NMP initiator in each arm. The non-NMP multi-functional central molecule may be any example of the multi-functional central molecule 13 set forth herein. Examples of the NMP mono-initiators include

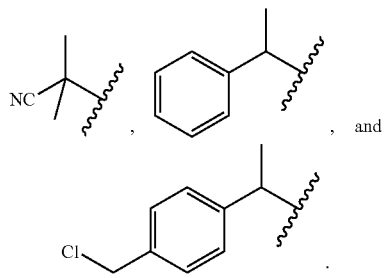

It is to be understood that any of the nitroxide end group(s) described herein may be attached to the NMP mono-initiator. In an example, each of the plurality of nitroxide mediated polymerization mono-initiators attached to the non-NMP multi-functional central molecule has a structure selected from the group consisting of:

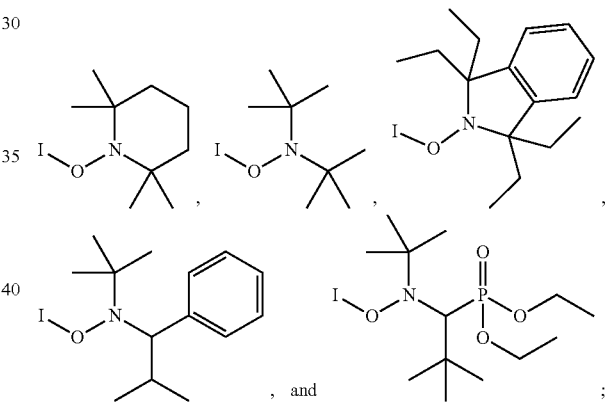

wherein I is selected from the group consisting of

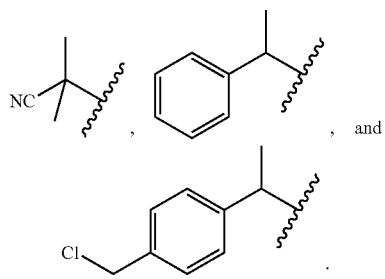

Any of these mono-initiators may be attached to any example of the central molecules/compounds 13 disclosed herein to form the dendritic core 12 including the NMP initiator in each arm.

It is to be understood that while several examples of the dendritic core 12 have been described, the structure of the dendritic core 12 will depend upon the polymerization process that is to be used to generate the multi-arm polymeric hydrogel 10. For example, the thiocarbonylthio group-containing dendritic core 12 may be used in RAFT polymerization, while the ATRP initiator-containing dendritic core 12 may be used in ATRP, and the NMP initiator-containing dendritic core 12 may be used in NMP. Other dendritic cores 12 may be prepared or obtained and used in other polymerization processes, such as ROP, etc.

In the examples of the multi-arm polymeric hydrogel 10 disclosed herein, the first acrylamide monomer 16 and the second acrylamide monomer 18 are incorporated into the arms 14 of the dendritic core 12.

The first acrylamide monomer 16 has the structure:

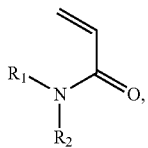

wherein $R_1$ and $R_2$ are independently selected from the group consisting of an alkyl, an alkylamino, an alkylamido, an alkylthiol, an aryl, a glycol, and optionally substituted variants thereof. $R_1$ and $R_2$ are selected to provide a more hydrophobic backbone to the arms 14. The $R_1$ and $R_2$ groups cannot form hydrogen bonds between polymer strands; which may help to increase the dry storage ability of the multi-arm polymeric hydrogel 10 without having deleterious effects on downstream sequencing operations. In one example, the first acrylamide monomer 16 is N,N-dimethylacrylamide.

The second acrylamide monomer 18 has the structure:

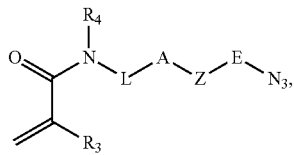

wherein $R_3$ is hydrogen or an alkyl; $R_4$ is hydrogen or an alkyl; L is a linker including a linear chain of 2 atoms to 20 atoms selected from the group consisting of carbon, oxygen, and nitrogen and optional substituents on the carbon and any nitrogen atoms in the chain; A is an N substituted amide having a structure

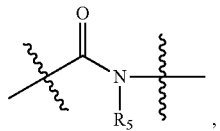

where $R_5$ is hydrogen or an alkyl; E is a linear chain of 1 atom to 4 atoms selected from the group consisting of carbon, oxygen and nitrogen, and optional substituents on the carbon and any nitrogen atoms in the chain; and Z is an optional nitrogen containing heterocycle.

The azide group of the second acrylamide monomer 18 can participate in cross-linking of the multi-arm polymeric hydrogel 10, can attach the multi-arm polymeric hydrogel 10, e.g., to the surface of a flow cell (see, e.g., FIG. 2A), and can attach primers (see, e.g., FIG. 2B and FIG. 2C).

When $R_3$ and/or $R_4$ is an alkyl, the number of carbons may range from 1 to 6 or from 1 to 4.

In the second acrylamide monomer 18, E may be an optionally substituted C1-C4 alkylene, each carbon optionally substituted with one or more substituents selected from, for example, C1-C4 alkyl, —OH,—OC1-C4 alkyl, or =O. As examples, E may be an unsubstituted C1-C4 alkylene, for example $CH_2$, $(CH_2)_2$, $(CH_2)_3$ or $(CH_2)_4$.

In other examples, E may include an ether, an ester or an amide. For example, E may include —$CH_2CH_2OCH_2$—, —$COCNHCH_2$— or —$CH_2COOCH_2$—.

In the second acrylamide monomer 18, L may be a linker including a linear chain that is a —C2-C20 alkylene- or a 3 to 20 atom linear heteroalkylene, each optionally substituted with one or more substituents selected from the group consisting of—C1-C4 alkyl, —OH,—OC1-C4 alkyl, or =O. L may be a linker with a linear chain that is a —C2-C6 alkylene-, optionally substituted with one or more—C1-C4 alkyl, —OH,—OC1-C4 alkyl, or =O substituents. L may be unsubstituted—C2-C6 alkylene-(also drawn as —$(CH_2)_{2-6}$—), for example L may be unsubstituted—C3-C4 alkylene-, for example —$(CH_2)_3$— or —$(CH_2)_4$—.

In other examples, L may be a linker including a linear chain that is a 3 to 20 atom linear heteroalkylene, optionally substituted with one or more substituents selected from the group consisting of—C1-C4 alkyl, —OH,—OC1-C4 alkyl, or =O. L may include one or more ethylene glycol units. L may be —$CH_2CH_2(OCH_2CH_2)_x$—$OCH_2CH_2$—, in which x is 0 to 10. In one example, x is 1, 2, 3, 4, 5, or 6. L may include one or more amide groups. For example, L may be—C2-C6 alkyl-NHC(O)—C2-C6 alkyl-, or L may be —$(CH_2)_2$—NHC(O)—$(CH_2)_2$— or —$(CH_2)_3$—NHC(O)—$(CH_2)_2$—. L may include one or more natural or unnatural amino acids, for example L may include one or more amino acids selected from the group consisting of glycine, alanine, valine, isoleucine, leucine, lysine, serine, threonine, cysteine, asparagine, or glutamine. In some examples, L may comprise 1, 2, or 3 amino acid units.

In the second acrylamide monomer 18, the N substituted amide, A, may be bonded to L and Z in two possible configurations, for example the carbonyl carbon of A may be bonded to L and the amide nitrogen of A may be bonded to Z. Alternatively, the carbonyl carbon of A may be bonded to Z and the amide nitrogen of A may be bonded to L.

In the second acrylamide monomer 18, Z may include a nitrogen containing heterocycle having from 5 to 10 ring members (from 5 to 10 atoms) e.g., a 5 to 10 membered heterocyclic ring, wherein the ring members are the atoms that form the back bone of the heterocyclic ring. Z may include a single cyclic structure or a fused structure comprising two or more ring systems. In the case of single cyclic structure, Z may comprise 5 or 6 ring members, e.g., Z may be a 5 or 6 membered heterocyclic ring. In the case of fused structure, Z may include 9 or 10 ring members. The nitrogen containing heterocycle may include more than one heteroatom, for example one or more additional nitrogen heteroatoms, or one or more oxygen heteroatoms, or one or more sulphur heteroatoms, or any suitable combination of such heteroatoms. The nitrogen containing heterocycle may be aromatic, for example pyridinyl, pyrimidinyl, pyrrolyl, pyrazolyl, imidazolyl, indolyl, quinolinyl, quinazolinyl. The nitrogen containing heterocycle may be aliphatic, for example a cycloalkyl. The aliphatic nitrogen containing heterocycle may be saturated or may include one or more double bonds while not being aromatic. In one example, the aliphatic nitrogen containing heterocycle may be pyrrolidinyl, pyridinyl, or pyrimidinyl.

One example of the second acrylamide monomer 18 (as shown in FIG. 1A, and does not include Z) is azido acetamido pentyl acrylamide, and specifically N-(5-azidoacetamidylpentyl) acrylamide. Variations of N-(5-azidoacetamidylpentyl) acrylamide may also be used, for example, the alkyl chain —(CH$_2$)— may range from 1 to 20 and/or each of the —(CH$_2$)— can be optionally substituted.

Some other examples of the second acrylamide monomer 18 including Z are:

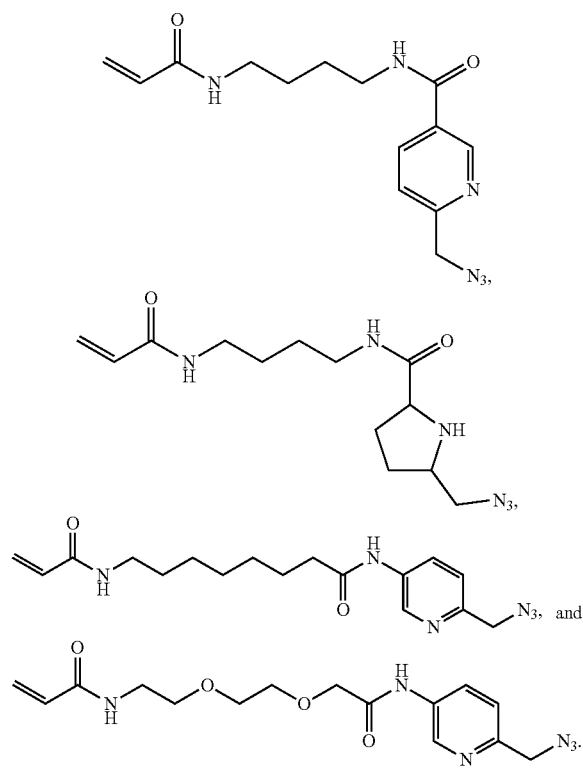

In the example shown in FIG. 1A, a mixture of the acrylamide monomers 16, 18 are polymerized in the presence of the multi-arm component (e.g., the dendritic core 12). In this example, the multi-arm component is a 4-arm RAFT agent containing four trithiocarbonate groups, the first acrylamide monomer 16 is N,N-dimethylacrylamide, and the second acrylamide monomer is azido acetamido pentyl acrylamide 18.

The mixture of the monomers 16, 18 may include water and a co-solvent (e.g., N-methyl-2-pyrollidone (NMP), dimethyl formamide (DMF), dimethyl sulfoxide (DMSO), acetonitrile (MeCN), methanol (MeOH), ethanol (EtOH), isopropyl alcohol (IPA), dioxane, acetone, dimethylacetamide (DMAc), or the like). The mixture may also include a buffer to at least substantially prevent undesirable changes in the pH. The pH of the mixture may be acidic (<7). Examples of suitable buffers include TRIS (tris(hydroxymethyl)aminomethane or TRIZMA®), Bis-tris methane buffer, ADA buffer (a zwitterionic buffering agent), MES (2-ethanesulfonic acid), MOPS (3-(N-morpholino)propanesulfonic acid), or another acidic buffer.

The polymerization reaction may take place at a temperature ranging from about 50° C. to about 80° C. for a time ranging from about 1 hour to about 48 hours. An initiator, including azo initiators, such as azobisisobutyronitrile or 2,2'-Azobis[2-(2-imidazolin-2-yl)propane]dihydrochloride (one commercially available example is VA-044 from Fuji-Film), may also be included in the mixture.

In some examples, the process shown in FIG. 1A incorporates the acrylamide monomers 16, 18 into each of the arms 14 randomly, although other monomer incorporation scenarios (e.g., statistical, alternating, etc.) are possible. Random incorporation may result in some blocks of the respective monomers 16 and/or 18. As such, in one example, the first acrylamide monomer 16 and the second acrylamide monomer 18 form a random copolymer in each arm 14 of the dendritic core 12. The mole ratio of the monomer 16 to the monomer 18 may range from about 5:95 to about 1:50, or from about 5:95 to about 50:1.

In another example, the acrylamide monomers 16, 18 may be incorporated into each of the arms 14 in controlled blocks. In this example, the block copolymer may be formed in the presence of the multi-arm component (e.g., the dendritic core 12). One example of this method involves polymerizing a first block with the first acrylamide monomer 16 in the presence of the multi-arm component (e.g., the dendritic core 12) to form a modified multi-arm component (which includes the first block in each arm 14); and then polymerizing a second block with the second acrylamide monomer 18 in the presence of the modified multi-arm component to form an example of the multi-arm polymeric hydrogel 10 (which includes both blocks in each arm 14). Another example of this method involves polymerizing a first block with the second acrylamide monomer 18 in the presence of the multi-arm component (e.g., the dendritic core 12) to form a modified multi-arm component (which includes the first block in each arm 14); and then polymerizing a second block with the first acrylamide monomer 16 in the presence of the modified multi-arm component to form an example of the multi-arm polymeric hydrogel 10 (which includes both blocks in each arm 14). In this example, the first acrylamide monomer 16 and the second acrylamide monomer 18 form a block copolymer in each arm 14 of the dendritic core 12.

In still other examples, another block may be added to the block copolymer. This block may include monomer units not utilized in the other blocks. In one example, the resulting block copolymer is a tri-block copolymer.

In still other examples, the acrylamide monomers 16, 18 may be incorporated into each of the arms 14 statistically, where the sequential distribution of the monomeric units obeys known statistical laws.

In still further examples, the acrylamide monomers 16, 18 may be incorporated into each of the arms 14 so that they are alternating along the length.

In still other examples, proteins and/or nanoparticles and/or other polymers may be conjugated to the end of each arm 14 of the dendritic core 12. These units may be copolymerized with the monomer units or may be introduced after polymerization.

It is to be understood that the arrangement of the recurring "n" and "m" features in FIG. 1A is representative, and the monomeric subunits 16, 18 may be present in any order (randomly, statistically, as alternating units, as a block copolymer, etc.). In an example, n is an integer ranging from 1 to 2,500 and m is an integer ranging from 1 to 2,500. In another example, n+m is an integer ranging from 2 to 5,000.

Any example of the hydrogel disclosed herein, including the multi-arm polymeric hydrogel 10, may contain a single cross-link per polymer molecule.

The molecular weight of any example of the hydrogel disclosed herein, including the multi-arm polymeric hydrogel 10, may vary depending, at least in part, upon the starting materials and the conversion percentage. As one example, the molecular weight of the multi-arm polymeric hydrogel 10 is about 850,000 g/mol.

Figure 1C:
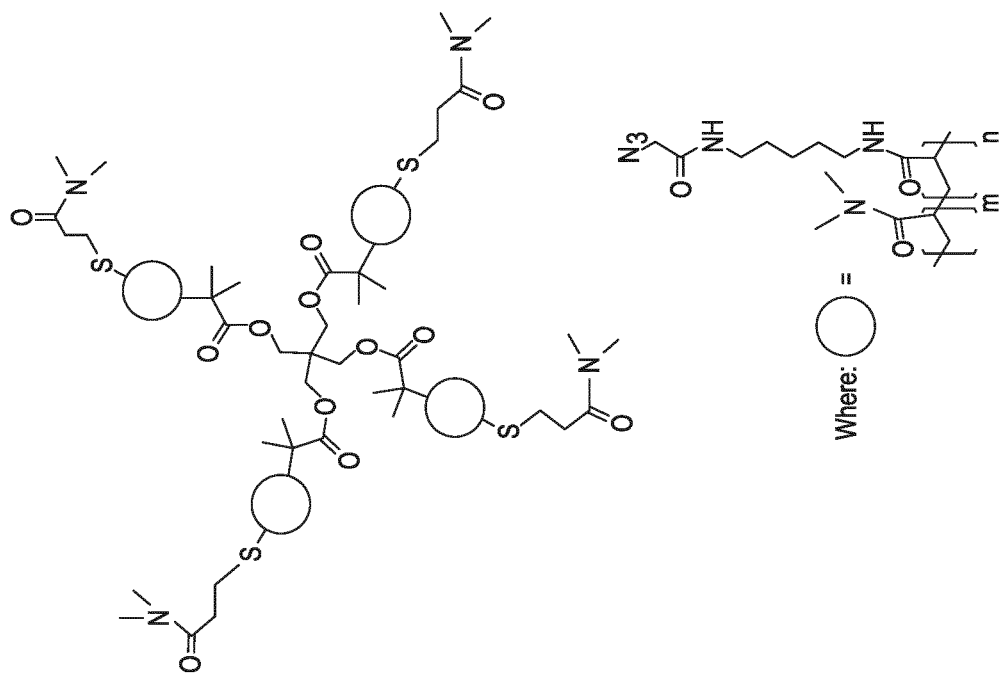
FIG. 1C is a chemical structure illustrating still another example of a multi-arm polymeric hydrogel.
Figure 1B:
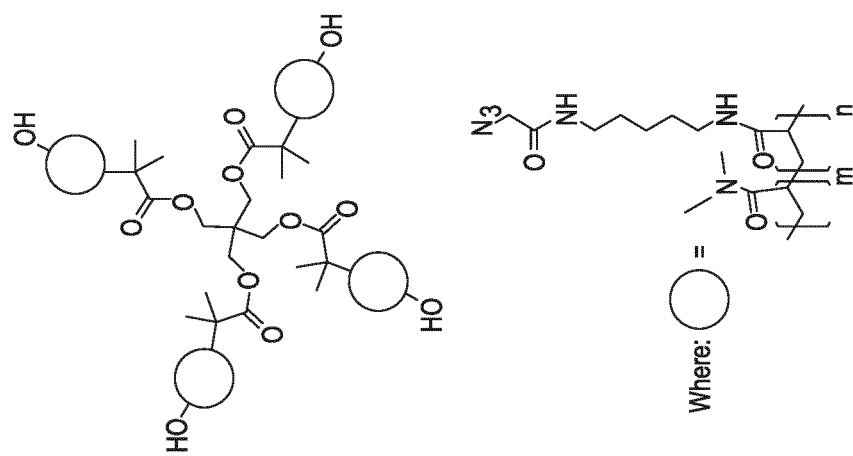
FIG. 1B is a chemical structure illustrating another example of a multi-arm polymeric hydrogel.

In other examples, the polymer end groups of the multi-arm polymeric hydrogel 10 may be cleaved, leaving the arms capped with a suitable end group. Cleavage may be performed using any suitable process, such as reaction with peroxide (resulting in an alcohol end group), reaction with an azide, radical induced end group removal, UV induced removal, oxidation-induced removal, or any other suitable technique. FIG. 1B and FIG. 1C illustrate two examples in which the polymer end groups of the multi-arm polymeric hydrogel 10 shown in FIG. 1A have been cleaved, and the arms have been capped with different ends groups.

Flow Cell

The hydrogel disclosed herein may be used in a flow cell 20, an example of which is depicted in FIG. 2A. The flow cell 20 includes a substrate 22 and the multi-arm polymeric hydrogel 10 on the substrate 22.

The substrate 22 may be a single layer/material. Examples of suitable single layer substrates include epoxy siloxane, glass, modified or functionalized glass, plastics (including acrylics, polystyrene and copolymers of styrene and other materials, polypropylene, polyethylene, polybutylene, polyurethanes, polytetrafluoroethylene (such as TEFLON@ from Chemours), cyclic olefins/cyclo-olefin polymers (COP) (such as ZEONOR® from Zeon), polyimides, etc.), nylon (polyamides), ceramics/ceramic oxides, silica, fused silica, or silica-based materials, aluminum silicate, silicon and modified silicon (e.g., boron doped p+ silicon), silicon nitride ($Si_3N_4$), silicon oxide ($SiO_2$), tantalum pentoxide ($Ta_2O_5$) or other tantalum oxide(s) ($TaO_x$), hafnium oxide ($HfO_2$), carbon, metals, inorganic glasses, or the like. The substrate 22 may also be a multi-layered structure. Some examples of the multi-layered structure include glass or silicon, with a coating layer of tantalum oxide or another ceramic oxide at the surface. Other examples of the multi-layered structure include an underlying support (e.g., glass or silicon) having a patterned resin thereon. Still other examples of the multi-layered substrate may include a silicon-on-insulator (SOI) substrate.

In an example, the substrate 22 may have a diameter ranging from about 2 mm to about 300 mm, or a rectangular sheet or panel having its largest dimension up to about 10 feet (~ 3 meters). In an example, the substrate 22 is a wafer having a diameter ranging from about 200 mm to about 300 mm. In another example, the substrate 22 is a die having a width ranging from about 0.1 mm to about 10 mm. While example dimensions have been provided, it is to be understood that a substrate 22 with any suitable dimensions may be used. For another example, a panel may be used that is a rectangular support, which has a greater surface area than a 300 mm round wafer.

In the example shown in FIG. 2A, the flow cell 20 includes flow channels 24. While several flow channels 24 are shown, it is to be understood that any number of channels 24 may be included in the flow cell 20 (e.g., a single channel 24, four channels 24, etc.). Each flow channel 24 is an area defined between two bonded components (e.g., the substrate 22 and a lid or two substrates 22), which can have fluids (e.g., those describe herein) introduced thereto and removed therefrom. Each flow channel 24 may be isolated from each other flow channel 24 so that fluid introduced into any particular flow channel 24 does not flow into any adjacent flow channel 24. Some examples of the fluids introduced into the flow channels 24 may introduce reaction components (e.g., polymerases, sequencing primers, nucleotides, etc.), washing solutions, deblocking agents, etc.

The flow channel 24 may be defined in the substrate 22 using any suitable technique that depends, in part, upon the material(s) of the substrate 22. In one example, the flow channel 24 is etched into a glass substrate 22. In another example, the flow channel 24 may be patterned into a resin of a multi-layered substrate 22 using photolithography, nanoimprint lithography, etc. In still another example, a separate material (not shown) may be applied to the substrate 22 so that the separate material defines the walls of the flow channel 24 and the substrate 22 defines the bottom of the flow channel 24.

In an example, the flow channel 24 has a rectilinear configuration. The length and width of the flow channel 24 may be smaller, respectively, than the length and width of the substrate 22 so that portion of the substrate surface surrounding the flow channel 24 is available for attachment to a lid (not shown) or another substrate 22. In some instances, the width of each flow channel 24 can be at least about 1 mm, at least about 2.5 mm, at least about 5 mm, at least about 7 mm, at least about 10 mm, or more. In some instances, the length of each lane 20 can be at least about 10 mm, at least about 25 mm, at least about 50 mm, at least about 100 mm, or more. The width and/or length of each flow channel 24 can be greater than, less than or between the values specified above. In another example, the flow channel 24 is square (e.g., 10 mm×10 mm).

The depth of each flow channel 24 can be as small as a monolayer thick when microcontact, aerosol, or inkjet printing is used to deposit a separate material that defines the flow channel walls. For other examples, the depth of each flow channel 24 can be about 1 μm, about 10 μm, about 50 μm, about 100 μm, or more. In an example, the depth may range from about 10 μm to about 100 μm. In another example, the depth may range from about 10 μm to about 30 μm. In still another example, the depth is about 5 μm or less. It is to be understood that the depth of each flow channel 24 be greater than, less than or between the values specified above.

Different examples of the architecture within the flow channels 24 of the flow cell 20 are shown FIG. 2B and FIG. 2C.

In the example shown in FIG. 2B, the flow cell 20 includes a single layer substrate 22A and a portion of the flow channel 24 defined in the single layer substrate 22A. In this example, the multi-arm polymeric hydrogel 10 is positioned within the flow channel 24.

To introduce the multi-arm polymeric hydrogel 10 (or any example of the hydrogel disclosed herein) into the flow channel 24, a mixture of the multi-arm polymeric hydrogel 10 may be generated and then applied to the substrate 22 (having the flow channel 24 defined therein). In one example, the multi-arm polymeric hydrogel 10 may be present in a mixture (e.g., with water or with ethanol and water). The mixture may then be applied to the substrate surfaces (including in the flow channel(s) 24) using spin coating, or dipping or dip coating, spray coating, or flow of the material under positive or negative pressure, or another suitable technique. These types of techniques blanketly deposit the catalytic polymeric hydrogel 16' on the substrate 24 (e.g., in the flow channel 26 and on the interstitial regions 28). Other selective deposition techniques (e.g. involving a mask, controlled printing techniques, etc.) may be used to specifically deposit the catalytic polymeric hydrogel 16' in the flow channel 26 and not on the interstitial regions 28.

In some examples, the substrate surface (including the portion that is exposed in the flow channel 24) may be activated, and then the mixture (including the hydrogel, such as the multi-arm polymeric hydrogel 10) may be applied thereto. In one example, a silane or silane derivative (e.g., norbornene silane) may be deposited on the substrate surface using vapor deposition, spin coating, or other deposition methods. In another example, the substrate surface may be exposed to plasma ashing to generate surface-activating agent(s) (e.g., —OH groups) that can adhere to the hydrogel, such as the multi-arm polymeric hydrogel 10.

Depending upon the hydrogel that is used, the applied mixture may be exposed to a curing process. In an example, curing may take place at a temperature ranging from room temperature (e.g., about 25° C.) to about 95° C. for a time ranging from about 1 millisecond to about several days. Depending on the material of the hydrogel, other suitable curing conditions are also possible.

Polishing may then be performed in order to remove the hydrogel, e.g., multi-arm polymeric hydrogel 10, from the interstitial regions 34 at the perimeter of the flow channel(s) 24, while leaving the hydrogel on the surface in the flow channel(s) 24 at least substantially intact.

The flow cell 20 also includes an amplification primer 26.

A grafting process may be performed to graft the amplification primers 26 to the hydrogel, e.g., the multi-arm polymeric hydrogel 10, in the flow channel 24. In an example, the amplification primers 26 can be immobilized to the hydrogel by single point covalent attachment at or near the 5' end of the primers 26. This attachment leaves i) an adapter-specific portion of the primers 26 free to anneal to its cognate sequencing-ready nucleic acid fragment and ii) the 3' hydroxyl group free for primer extension. Any suitable covalent attachment may be used for this purpose. Examples of terminated primers that may be used include alkyne terminated primers, which can attach to the azide moiety of the hydrogel. Specific examples of suitable primers 26 include P5 and P7 primers used on the surface of commercial flow cells sold by Illumina Inc. for sequencing on HISEQ™, HISEQX™, MISEQ™, MISEQDX™, MINISEQ™, NEXTSEQ™ NEXTSEQ™ DX™, NOVASEQ™, GENOME ANALYZER™, ISEQ™, and other instrument platforms.

In an example, grafting may involve flow through deposition (e.g., using a temporarily bound or permanently bonded lid), dunk coating, spray coating, puddle dispensing, or by another suitable method that will attach the primer(s) 26 to the hydrogel in the flow channel 24. Each of these example techniques may utilize a primer solution or mixture, which may include the primer(s) 26, water, a buffer, and a catalyst. With any of the grafting methods, the primers 26 react with reactive groups of the hydrogel in the flow channel 24 and have no affinity for the surrounding substrate 22. As such, the primers 26 selectively graft to the hydrogel in the flow channel 24.

In the example shown in FIG. 2C, the flow cell 20 includes a multi-layer substrate 22B, which includes a support 28 and a patterned material 30 positioned on the support 28. The patterned material 30 defines depressions 32 separated by interstitial regions 34.

In the example shown in FIG. 2C, the patterned material 30 is positioned on the support 28. It is to be understood that any material that can be selectively deposited, or deposited and patterned to form the depressions 32 and the interstitial regions 34 may be used for the patterned material 30.

As one example, an inorganic oxide may be selectively applied to the support 28 via vapor deposition, aerosol printing, or inkjet printing. Examples of suitable inorganic oxides include tantalum oxide (e.g., $Ta_2O_5$), aluminum oxide (e.g., $Al_2O_3$), silicon oxide (e.g., $SiO_2$), hafnium oxide (e.g., $HfO_2$), etc.

As another example, a resin may be applied to the support 28 and then patterned. Suitable deposition techniques include chemical vapor deposition, dip coating, dunk coating, spin coating, spray coating, puddle dispensing, ultrasonic spray coating, doctor blade coating, aerosol printing, screen printing, microcontact printing, etc. Suitable patterning techniques include photolithography, nanoimprint lithography (NIL), stamping techniques, embossing techniques, molding techniques, microetching techniques, printing techniques, etc. Some examples of suitable resins include a polyhedral oligomeric silsesquioxane resin (POSS)-based resin, a non-POSS epoxy resin, a poly(ethylene glycol) resin, a polyether resin (e.g., ring opened epoxies), an acrylic resin, an acrylate resin, a methacrylate resin, an amorphous fluoropolymer resin (e.g., CYTOP® from Bellex), and combinations thereof.

As used herein, the term "polyhedral oligomeric silsesquioxane" (POSS) refers to a chemical composition that is a hybrid intermediate (e.g., $RSiO_{1.5}$) between that of silica ($SiO_2$) and silicone ($R_2SiO$). An example of POSS can be that described in Kehagias et al., Microelectronic Engineering 86 (2009), pp. 776-778, which is incorporated by reference in its entirety. In an example, the composition is an organosilicon compound with the chemical formula $[RSiO_{3/2}]_n$, where the R groups can be the same or different. Example R groups for POSS include epoxy, azide/azido, a thiol, a poly(ethylene glycol), a norbornene, a tetrazine, acrylates, and/or methacrylates, or further, for example, alkyl, aryl, alkoxy, and/or haloalkyl groups. The resin composition disclosed herein may comprise one or more different cage or core structures as monomeric units. The polyhedral structure may be a $T_8$ structure, such as:

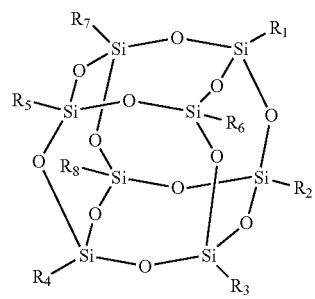

and represented by:

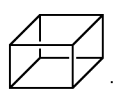

$T_8$

This monomeric unit typically has eight arms of functional groups $R_1$ through $R_8$.

The monomeric unit may have a cage structure with 10 silicon atoms and 10 R groups, referred to as $T_{10}$, such as:

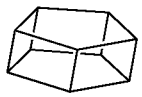, or may have a cage structure with 12 silicon atoms and 12 R groups, referred to as $T_{12}$, such as:

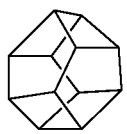

The POSS-based material may alternatively include $T_6$, $T_{14}$, or $T_{16}$ cage structures. The average cage content can be adjusted during the synthesis, and/or controlled by purification methods, and a distribution of cage sizes of the monomeric unit(s) may be used in the examples disclosed herein.

In some of the POSS examples disclosed herein, at least one of $R_1$ through $R_8$ or $R_{10}$ or $R_{12}$ comprises an epoxy. $R_1$ through $R_8$ or $R_{10}$ or $R_{12}$ may or may not be the same, and in some examples at least one of $R_1$ through $R_8$ or $R_{10}$ or $R_{12}$ comprises epoxy and at least one other of $R_1$ through $R_8$ or $R_{10}$ or $R_{12}$ is a non-epoxy functional group. The non-epoxy functional group may be (a) a reactive group that is orthogonally reactive to an epoxy group (i.e., reacts under different conditions than an epoxy group), that serves as a handle for coupling the resin to an amplification primer, a polymer, or a polymerization agent; or (b) a group that adjusts the mechanical or functional properties of the resin, e.g., surface energy adjustments. In some examples, the non-epoxy functional group is selected from the group consisting of an azide/azido, a thiol, a poly(ethylene glycol), a norbornene, a tetrazine, an amino, a hydroxyl, an alkynyl, a ketone, an aldehyde, an ester group, an alkyl, an aryl, an alkoxy, and a haloalkyl.

As shown in FIG. 2C, the patterned material 30 includes the depressions 32 defined therein, and interstitial regions 34 separating adjacent depressions 32. Many different layouts of the depressions 32 may be envisaged, including regular, repeating, and non-regular patterns. In an example, the depressions 32 are disposed in a hexagonal grid for close packing and improved density. Other layouts may include, for example, rectilinear (rectangular) layouts, triangular layouts, and so forth. In some examples, the layout or pattern can be an x-y format of depressions 32 that are in rows and columns. In some other examples, the layout or pattern can be a repeating arrangement of depressions 32 and/or interstitial regions 34. In still other examples, the layout or pattern can be a random arrangement of depressions 32 and/or interstitial regions 34. The pattern may include spots, pads, wells, posts, stripes, swirls, lines, triangles, rectangles, circles, arcs, checks, plaids, diagonals, arrows, squares, and/or cross-hatches.

The layout or pattern of the depressions 32 may be characterized with respect to the density of the depressions 32 (number of depressions 32) in a defined area. For example, the depressions 32 may be present at a density of approximately 2 million per $mm^2$. The density may be tuned to different densities including, for example, a density of about 100 per $mm^2$, about 1,000 per $mm^2$, about 0.1 million per $mm^2$, about 1 million per $mm^2$, about 2 million per $mm^2$, about 5 million per $mm^2$, about 10 million per $mm^2$, about 50 million per $mm^2$, or more, or less. It is to be further understood that the density of depressions 32 in the patterned material 30 can be between one of the lower values and one of the upper values selected from the ranges above. As examples, a high density array may be characterized as having depressions 32 separated by less than about 100 nm, a medium density array may be characterized as having depressions 32 separated by about 400 nm to about 1 µm, and a low density array may be characterized as having depressions 32 separated by greater than about 1 µm. While example densities have been provided, it is to be understood that any suitable densities may be used. The density of the depressions 32 may depend, in part, on the depth of the depressions 32. In some instances, it may be desirable for the spacing between depressions 32 to be even greater than the examples listed herein.

The layout or pattern of the depressions 32 may also or alternatively be characterized in terms of the average pitch, or the spacing from the center of the depression 32 to the center of an adjacent depression 32 (center-to-center spacing) or from the edge of one depression 32 to the edge of an adjacent depression 32 (edge-to-edge spacing). The pattern can be regular, such that the coefficient of variation around the average pitch is small, or the pattern can be non-regular in which case the coefficient of variation can be relatively large. In either case, the average pitch can be, for example, about 50 nm, about 0.1 µm, about 0.5 µm, about 1 µm, about 5 µm, about 10 µm, about 100 µm, or more or less. The average pitch for a particular pattern of depressions 32 can be between one of the lower values and one of the upper values selected from the ranges above. In an example, the depressions 32 have a pitch (center-to-center spacing) of about 1.5 µm. While example average pitch values have been provided, it is to be understood that other average pitch values may be used.

The size of each depression 32 may be characterized by its volume, opening area, depth, and/or diameter.

Each depression 32 can have any volume that is capable of confining a fluid. The minimum or maximum volume can be selected, for example, to accommodate the throughput (e.g., multiplexity), resolution, labeled nucleotides, or analyte reactivity expected for downstream uses of the flow cell 20. For example, the volume can be at least about $1 \times 10^{-3}$ µm$^3$, at least about $1 \times 10^{-2}$ µm$^3$, at least about 0.1 µm$^3$, at least about 1 µm$^3$, at least about 10 µm$^3$, at least about 100 µm$^3$, or more. Alternatively or additionally, the volume can be at most about $1 \times 10^4$ µm$^3$, at most about $1 \times 10^3$ µm$^3$, at most about 100 µm$^3$, at most about 10 µm$^3$, at most about 1 µm$^3$, at most about 0.1 µm$^3$, or less.

The area occupied by each depression opening can be selected based upon similar criteria as those set forth above for the volume. For example, the area for each depression opening can be at least about $1 \times 10^{-3}$ µm$^2$, at least about $1 \times 10^{-2}$ µm$^2$, at least about 0.1 µm$^2$, at least about 1 µm$^2$, at least about 10 µm$^2$, at least about 100 µm$^2$, or more. Alternatively or additionally, the area can be at most about $1 \times 10^3$ µm$^2$, at most about 100 µm$^2$, at most about 10 µm$^2$, at most about 1 µm$^2$, most about 0.1 µm$^2$, at most about $1 \times 10^{-2}$ µm$^2$, or less. The area occupied by each depression opening can be greater than, less than or between the values specified above.

The depth of each depression 32 can large enough to house some of the hydrogel, e.g., the multi-arm polymeric hydrogel 10. In an example, the depth may be at least about 0.1 µm, at least about 0.5 µm, at least about 1 µm, at least about 10 µm, at least about 100 µm, or more. Alternatively or additionally, the depth can be at most about $1\times10^3$ µm, at most about 100 µm, at most about 10 µm, or less. In some examples, the depth is about 0.4 µm. The depth of each depression 32 can be greater than, less than or between the values specified above.

In some instances, the diameter or length and width of each depression 32 can be at least about 50 nm, at least about 0.1 µm, at least about 0.5 µm, at least about 1 µm, at least about µm, at least about 100 µm, or more. Alternatively or additionally, the diameter or length and width can be at most about $1\times10^3$ µm, at most about 100 µm, at most about 10 µm, at most about 1 µm, at most about 0.5 µm, at most about 0.1 µm, or less (e.g., about 50 nm). In some examples, the diameter or length and width is about 0.4 m. The diameter or length and width of each depression 32 can be greater than, less than or between the values specified above.

In the example shown in FIG. 2C, the hydrogel (e.g., the multi-arm polymeric hydrogel 10) is positioned within each of the depressions 32. The multi-arm polymeric hydrogel 10 or any other example of the hydrogel disclosed herein may be applied as described in reference to FIG. 2B, so that the hydrogel is present in the depressions 32 and not present on the surrounding interstitial regions 34.

In the example shown in FIG. 2C, the primers 26 may be grafted to the hydrogel within each of the depressions 32. The primers 26 may be applied as described in reference to FIG. 2B, and thus will graft to the hydrogel and not to the surrounding interstitial regions 34.

While not shown in FIG. 2A, FIG. 2B, or FIG. 2C, it is to be understood that the flow cell 20 may also include a lid attached to the substrate 22. In an example, the lid may be bonded to at least a portion of the substrate 22, e.g., at some of the interstitial regions 34. The bond that is formed between the lid and the substrate 22 may be a chemical bond, or a mechanical bond (e.g., using a fastener, etc.).

The lid may be any material that is transparent to an excitation light that is directed toward the substrate 22. As examples, the lid may be glass (e.g., borosilicate, fused silica, etc.), plastic, or the like. A commercially available example of a suitable borosilicate glass is D 263®, available from Schott North America, Inc. Commercially available examples of suitable plastic materials, namely cyclo olefin polymers, are the ZEONOR® products available from Zeon Chemicals L.P.

The lid may be bonded to the substrate 22 using any suitable technique, such as laser bonding, diffusion bonding, anodic bonding, eutectic bonding, plasma activation bonding, glass frit bonding, or others methods known in the art. In an example, a spacer layer may be used to bond the lid to the substrate 22. The spacer layer may be any material that will seal at least some of the substrate 22 and the lid together. In some examples, the spacer layer can be a radiation-absorbing material that aids in bonding of the substrate 22 and the lid.

In other examples, the flow cell 20 may also include an additional patterned or non-patterned substrate 22 attached to the substrate 22.

Sequencing Method

Examples of the flow cell 20 may be used in an ensemble sequencing technique, such as sequencing by synthesis (SBS). In ensemble sequencing, a template polynucleotide chain (not shown) that is to be sequenced may be formed on the flow cell using the primers 26. At the outset of template polynucleotide chain formation, library templates may be prepared from any nucleic acid sample (e.g., a DNA sample or an RNA sample). The DNA nucleic acid sample may be fragmented into single-stranded, similarly sized (e.g., <1000 bp) DNA fragments. The RNA nucleic acid sample may be used to synthesize complementary DNA (cDNA), and the cDNA may be fragmented into single-stranded, similarly sized (e.g., <1000 bp) cDNA fragments. During preparation, adapters may be added to the ends of these fragments. Through reduced cycle amplification, different motifs may be introduced in the adapters, such as sequencing binding sites, indices, and regions that are complementary to the primers 26 in the depressions 32. The final library templates include the DNA or cDNA fragment and adapters at both ends. In some examples, the the DNA or cDNA fragments from a single nucleic acid sample have the same adapters added thereto. The DNA or cDNA fragment represents the portion of the final library template that is to be sequenced.

A plurality of library templates may be introduced to the flow cell 20. Multiple library templates are hybridized, for example, to one of two types of primers 26 immobilized in the flow channel 24 or in the depressions 32.

Cluster generation may then be performed. In one example of cluster generation, the library templates are copied from the hybridized primers by 3' extension using a high-fidelity DNA polymerase. The original library templates are denatured, leaving the copies immobilized in the flow channel 24 or in the depressions 32. Isothermal bridge amplification or some other form of amplification may be used to amplify the immobilized copies. For example, the copied templates loop over to hybridize to an adjacent, complementary primer 26, and a polymerase copies the copied templates to form double stranded bridges, which are denatured to form two single stranded strands. These two strands loop over and hybridize to adjacent, complementary primers 26 and are extended again to form two new double stranded loops. The process is repeated on each template copy by cycles of isothermal denaturation and amplification to create dense clonal clusters. Each cluster of double stranded bridges is denatured. In an example, the reverse strand is removed by specific base cleavage, leaving forward template polynucleotide strands. Clustering results in the formation of several template polynucleotide chains in the flow channel 24 or in each depression 32. This example of clustering is bridge amplification, and is one example of the amplification that may be performed. It is to be understood that other amplification techniques may be used, such as the exclusion amplification (Examp) workflow (Illumina Inc.).

A sequencing primer may be introduced that hybridizes to a complementary sequence on the template polynucleotide chain. This sequencing primer renders the template polynucleotide chain ready for sequencing.

To initiate sequencing, an incorporation mix may be added to the flow cell 20. In one example, the incorporation mix includes a liquid carrier, a polymerase, and fluorescently labeled nucleotides. The fluorescently labeled nucleotides may include a 3' OH blocking group. When the incorporation mix is introduced into the flow cell 20, the fluid enters the flow channel 24 and/or the depressions 32 (where the template polynucleotide chains are present).

The fluorescently labeled nucleotides are added to the sequencing primer (thereby extending the sequencing primer) in a template dependent fashion such that detection of the order and type of nucleotides added to the sequencing primer can be used to determine the sequence of the template. More particularly, one of the nucleotides is incorporated, by a respective polymerase, into a nascent strand that extends the sequencing primer and that is complementary to the template polynucleotide chain. In other words, in at least some of the template polynucleotide chains across the flow cell 20, respective polymerases extend the hybridized sequencing primer by one of the nucleotides in the incorporation mix.

The incorporation of the nucleotides can be detected through an imaging event. During an imaging event, an illumination system (not shown) may provide an excitation light to the flow channel 24 and/or depressions 32.

In some examples, the nucleotides can further include a reversible termination property (e.g., the 3' OH blocking group) that terminates further primer extension once a nucleotide has been added to the sequencing primer. For example, a nucleotide analog having a reversible terminator moiety can be added to the sequencing primer such that subsequent extension cannot occur until a deblocking agent is delivered to remove the moiety. Thus, for examples that use reversible termination, a deblocking reagent can be delivered to the flow cell 20 after detection occurs.

Wash(es) may take place between the various fluid delivery steps. The SBS cycle can then be repeated n times to extend the sequencing primer by n nucleotides, thereby detecting a sequence of length n.

While SBS has been described in detail, it is to be understood that the flow cells 20 described herein may be utilized with other sequencing protocol, for genotyping, or in other chemical and/or biological applications. In some instances, the primers of the flow cell may be selected to enable simultaneous paired-end sequencing, where both forward and reverse strands are present on the hydrogel, allowing for simultaneous base calling of each read. Sequential and simultaneously paired-end sequencing facilitates detection of genomic rearrangements and repetitive sequence elements, as well as gene fusions and novel transcripts. In another example, the flow cells 10 disclosed herein may be used for on-cell library generation.

To further illustrate the present disclosure, examples are given herein. It is to be understood that these examples are provided for illustrative purposes and are not to be construed as limiting the scope of the present disclosure.

NON-LIMITING WORKING EXAMPLES

Example 1

An example of the multi-arm polymeric hydrogel was prepared using RAFT polymerization in accordance with the scheme shown in FIG. 1.

A comparative polymeric hydrogel (poly(N-(5-azidoacetamidylpentyl)acrylamide-co-acrylamide)) was prepared by co-polymerizing acrylamide and N-(5-azidoacetamidylpentyl) acrylamide using a free radical synthesis.

Figure 3:
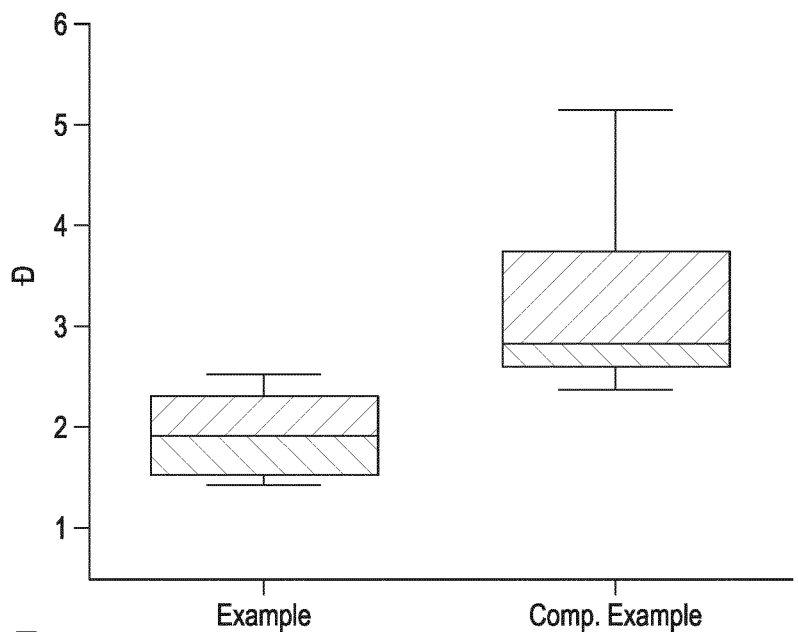
FIG. 3 is a bar graph depicting, in one example, the dispersity (D) for an example multi-arm polymeric hydrogel and a comparative example polymeric hydrogel.

The dispersity of the example multi-arm polymeric hydrogel and the comparative polymeric hydrogel was calculated. The results are shown in FIG. 3, where the median for the example polymeric hydrogel was about 1.9 and the median for the comparative polymeric hydrogel was about 3.3. As depicted, the dispersity of the example multi-arm polymeric hydrogel was much lower than the comparative polymeric hydrogel, and thus the example multi-arm polymeric hydrogel has a narrower molecular weight distribution than the comparative polymeric hydrogel.

Example 2

The example multi-arm polymeric hydrogel and the comparative polymeric hydrogel of Example 1 were coated in flow channels on respective glass (specifically fused silica) slides, and 0.1-50 µM oligonucleotide primers were grafted on each of the polymer layers. The flow cells were stored at 60° C. for 20 days.

After storage, 300 sequencing cycles were performed in each of the channels using a PhiX library.

Figure 4:
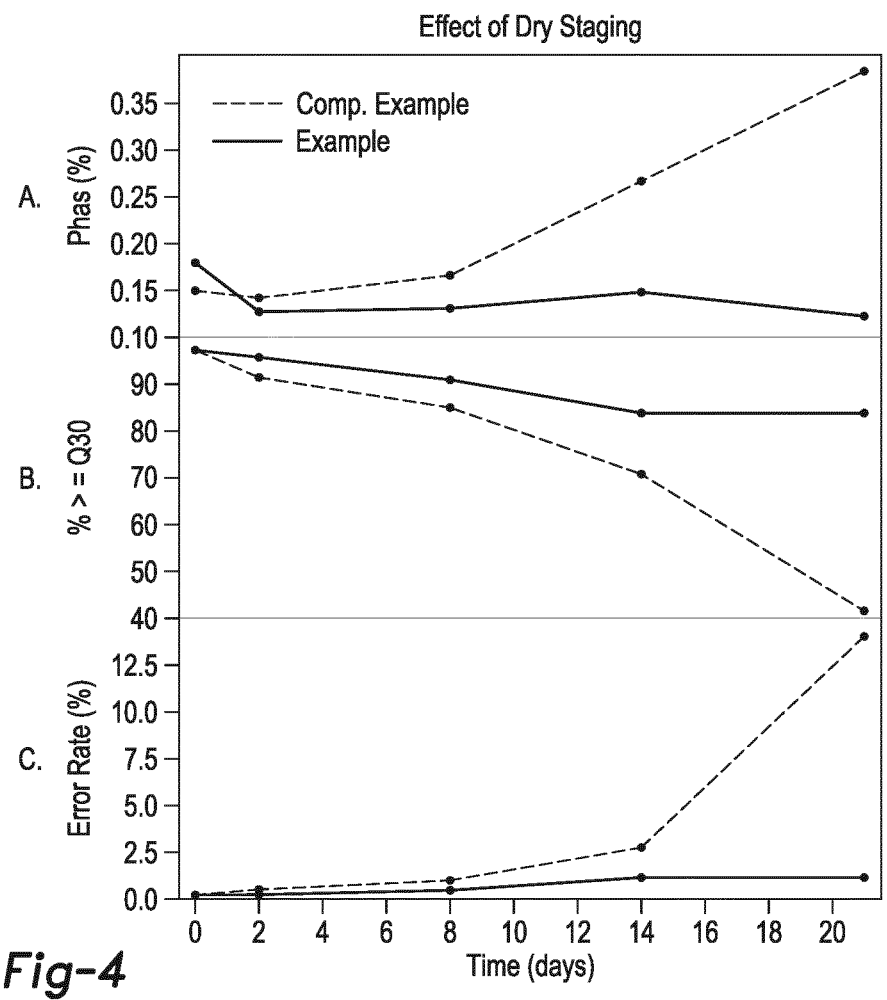
FIG. 4 includes graphs (labeled A, B, and C) which depict, in one example, the effects of dry staging on the example multi-arm polymeric hydrogel and the comparative example polymeric hydrogel.

The sequencing data collected included phasing (percentage, shown in FIG. 4 at A), quality score (percentage greater than Q30, shown in FIG. 4 at B), and error rate (percentage) (shown in FIG. 4 at C). Phasing is the rate at which single molecules within a cluster loose sync with each other. Therefore, a lower phasing percentage is more desirable. Q30 is equivalent to the probability of an incorrect base call 1 in 1000 times. This means that the base call accuracy (i.e., the probability of a correct base call) is 99.9%. A lower base call accuracy of 99% (Q20) will have an incorrect base call probability of 1 in 100, meaning that every 100 base pair sequencing read will likely contain an error. When sequencing quality reaches Q30, virtually all of the reads will be perfect, having zero errors and ambiguities. As shown in FIG. 4, at A, B, and C, the example multi-arm polymeric hydrogel performed better than the comparative example with regard to phasing, Q30, and error rate. The phasing results for the example multi-arm polymeric hydrogel remained at or below 0.19%, even when stored for longer periods, such as 14 days and 20 days. In contrast, the phasing results for the comparative example multi-arm polymeric hydrogel increased to about 0.26% at 14 days and to about 0.39% at 20 days. The Q30 results for the example multi-arm polymeric hydrogel remained at or above 85%, even when stored for the longer periods. In contrast, the Q30 results for the comparative example multi-arm polymeric hydrogel decreased to about 70% at 14 days and to almost 40% at 20 days. The error rate results for the example multi-arm polymeric hydrogel remained at or below 2%, even when stored for the longer periods. In contrast, the error rate results for the comparative example multi-arm polymeric hydrogel decreased to about 2.5% at 14 days and to almost 14% at 20 days. All of these results indicate that the example multi-arm polymeric hydrogel is more resistant to irreversible changes as a result of dry staging than the comparative example polymeric hydrogel.

Moreover, the multi-arm polymeric hydrogel architecture may also minimize interactions between the multi-arm polymeric hydrogel and DNA during clustering and/or sequencing, which may be contributing to the improved sequencing performance/metrics.

Example 3

The example multi-arm polymeric hydrogel and the comparative polymeric hydrogel of Example 1 were respectively coated in the depressions of four glass (specifically fused silica) flow channels (lanes) of two different patterned flow cells, and 0.1-50 µM oligonucleotide primers were grafted on the polymers in the depressions.

More than 300 sequencing cycles were performed in each of the flow channels using a PhiX library.

Figure 5A:
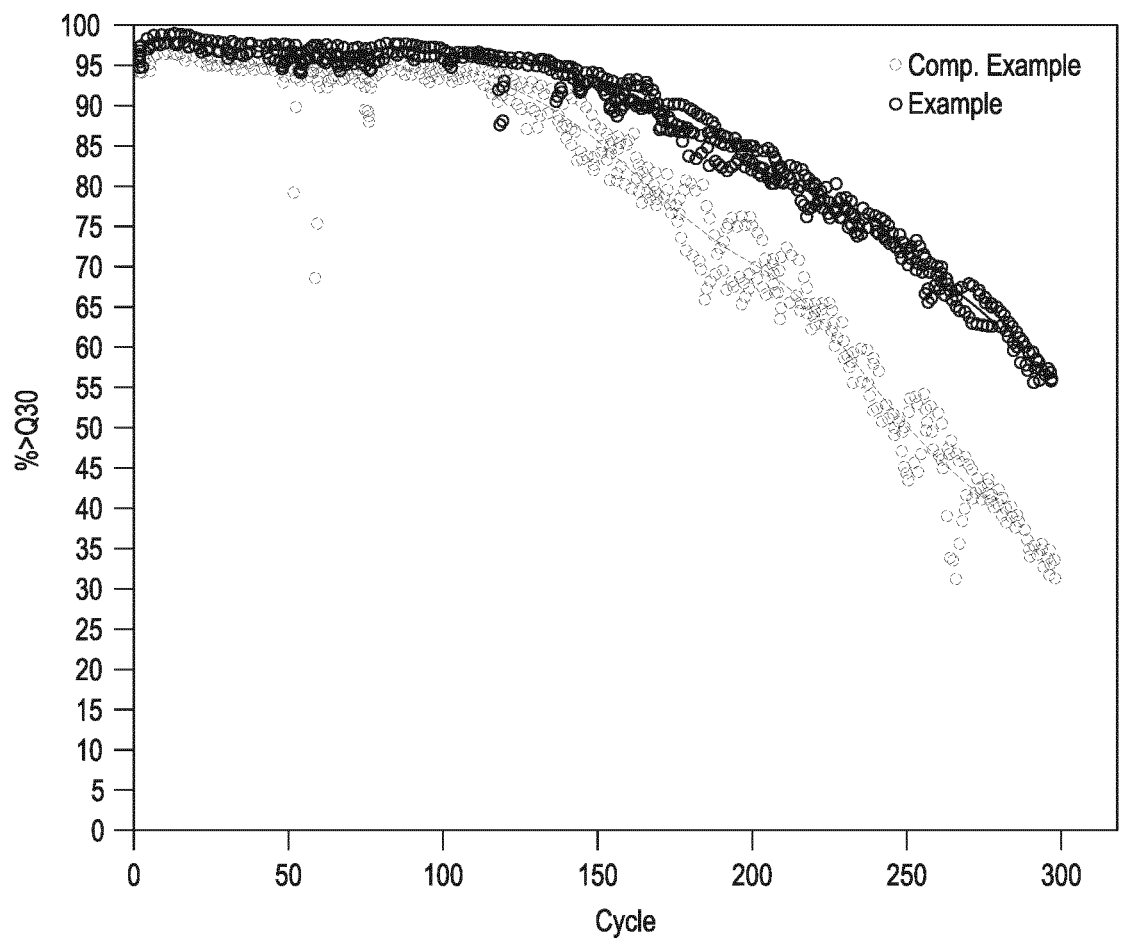
FIG. 5A is a graph depicting, in one example, the quality metric percentage for flow cells including the example multi-arm polymeric hydrogel and for comparative flow cells including the comparative example polymeric hydrogel.
Figure 5B:
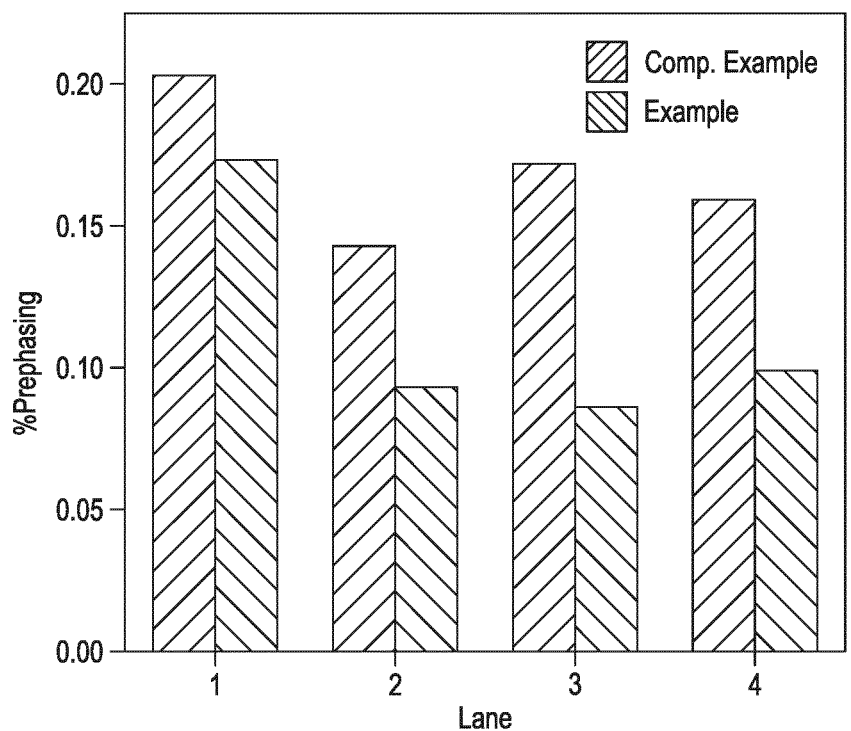
FIG. 5B is a graph depicting, in one example, the percentage of pre-phasing for flow cells including the example hydrogel and for comparative flow cells including the comparative example hydrogel.

The sequencing data collected included quality score (percentage greater than Q30, shown in FIG. 5A) and pre-phasing (percentage, shown in FIG. 5B). As shown in FIG. 5A, the quality metrics decreased slower for the example multi-arm polymeric hydrogel than for the comparative example polymeric hydrogel, resulting in better sequencing runs especially toward large number of cycles. The Q30 results for the example multi-arm polymeric hydrogel remained at or above 55% for all cycles, and at or above 85% for about 200 cycles. In contrast, the Q30 results for the comparative example multi-arm polymeric hydrogel decreased below 80% at about 175 cycles, and then dropped below 55% at about 240 cycles. As shown in FIG. 5B, pre-phasing was significantly reduced for the example multi-arm polymeric hydrogel when compared to the comparative example polymeric hydrogel, resulting in better sequencing runs. The average pre-phasing results for the example multi-arm polymeric hydrogel across the 4 lanes was about 0.11%, whereas the average pre-phasing results for the comparative example multi-arm polymeric hydrogel across the four lanes was about 0.17%.

Example 4

The example multi-arm polymeric hydrogel and the comparative polymeric hydrogel of Example 1 were respectively coated in depressions of a resin layer of a multi-layer substrate, and 0.1-50 µM oligonucleotide primers were grafted on each of the polymer layers.

151 sequencing cycles were performed during read 1 (R1) and read 2 (R2) in each of the flow channels using a human library with 1% PhiX library.

Figure 6A:
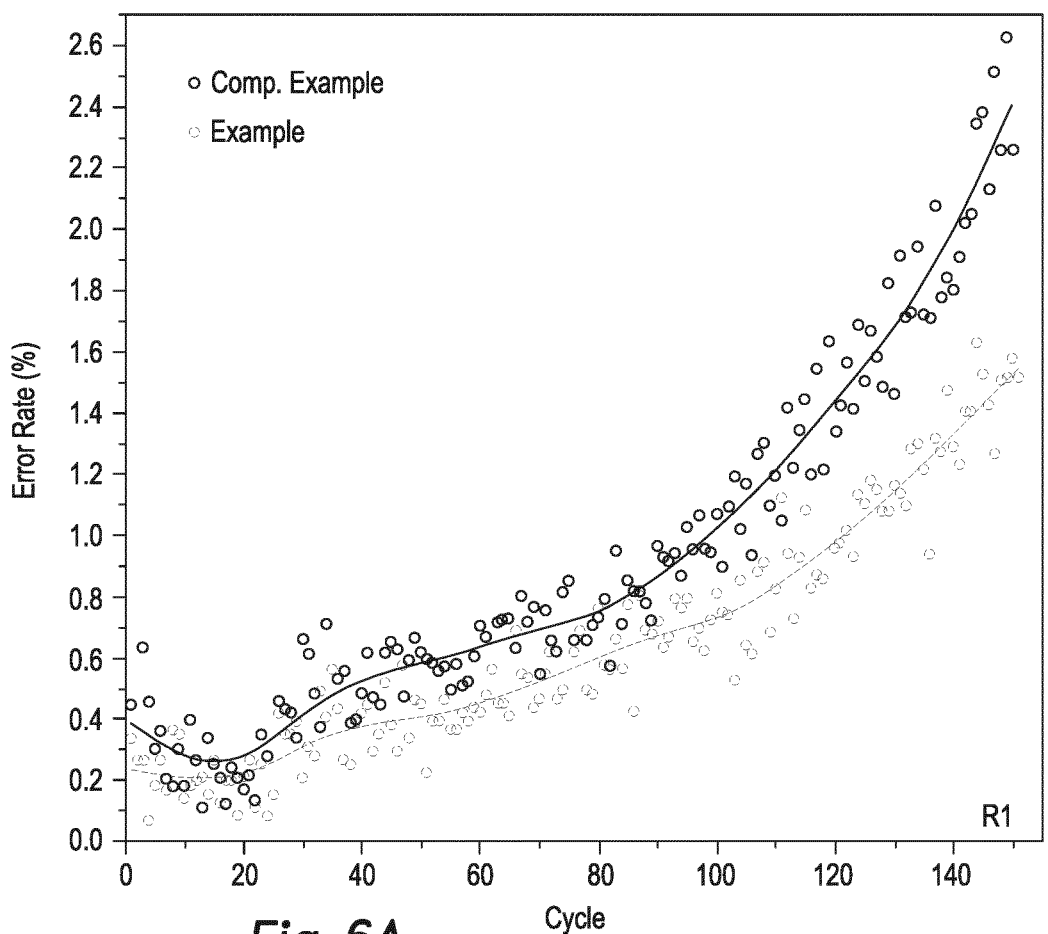
FIG. 6A is a graph depicting, in one example, the error rate for each sequencing cycle for a first read for flow cells including the example multi-arm polymeric hydrogel and the comparative flow cells including the comparative example polymeric hydrogel.
Figure 6B:
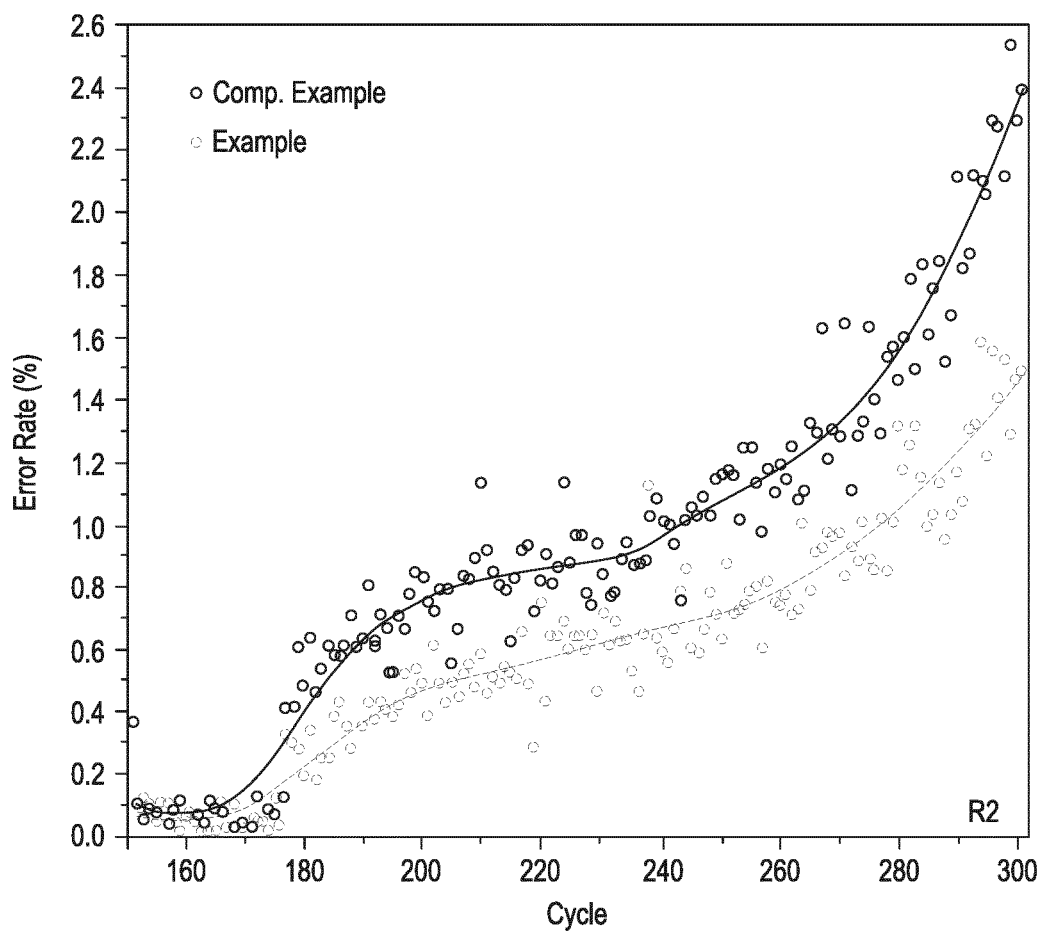
FIG. 6B is a graph depicting, in one example, the error rate for each sequencing cycle for a second read for flow cells including the example hydrogel and the comparative flow cells including the comparative example hydrogel.

The sequencing data collected included error rate (percentage, shown in FIG. 6A for R1 and FIG. 6B for R2). As shown in FIG. 6A and FIG. 6B, the error rate for the example multi-arm polymeric hydrogel was significantly reduced compared to the comparative example polymeric hydrogel during each read. The mean error rate for the flow cell with the example multi-arm polymeric hydrogel was 0.65, compared to 0.93 for the comparative flow cell with the comparative polymeric hydrogel.

Example 5

The example multi-arm polymeric hydrogel and the comparative polymeric hydrogel of Example 1 were respectively coated in the depressions of four glass (specifically fused silica) flow channels (lanes) of two different patterned flow cells, and 0.1-50 µM oligonucleotide primers were grafted on each of the polymer layers.

151 sequencing cycles were performed in each of the flow channels using a human library with 1% PhiX library.

The sequencing data collected included first cycle (C1) intensity, passing filter (% PF) (percentage), phasing (%), pre-phasing (%), Q30, and error rate. Passing filter (PF) is the metric used to describe clusters which pass a chastity threshold and are used for further processing and analysis of sequencing data. A higher % passing filter result indicates an increased yield of unique clusters used for sequencing data. Reproducible data was observed across the lanes of the flow cells. The sequencing data for one of the lanes of each of the flow cells is shown in Table 1.

TABLE 1

| Polymer | C1 Intensity | PF (%) | Phasing (%) | Pre-phasing (%) | Q30 (%) | Error Rate (%) |
|---|---|---|---|---|---|---|
| Example multi-arm polymeric hydrogel | 239 | 75.97 | 0.120 | 0.105 | 76.64 | 0.72 |
| Comparative polymeric hydrogel | 238 | 52.18 | 0.116 | 0.115 | 69.84 | 1.12 |

Figure 7A:
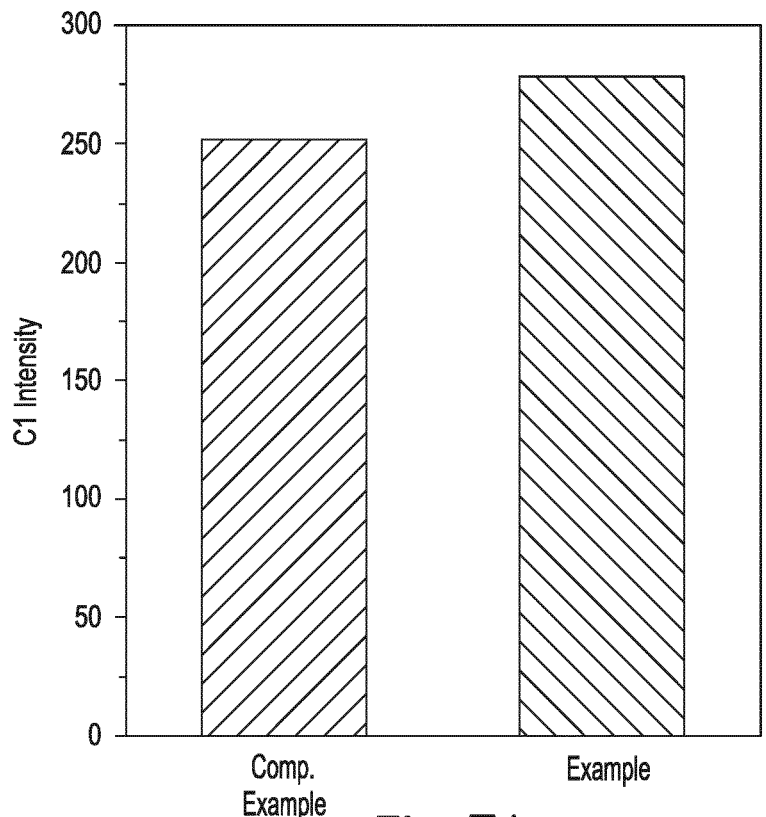
FIG. 7A is a bar graph depicting, in one example, the mean fluorescence intensity after a first or initial sequencing cycle (C1) for flow cell lanes including the example multi-arm polymeric hydrogel and comparative flow cell lanes including the comparative example polymeric hydrogel.
Figure 7B:
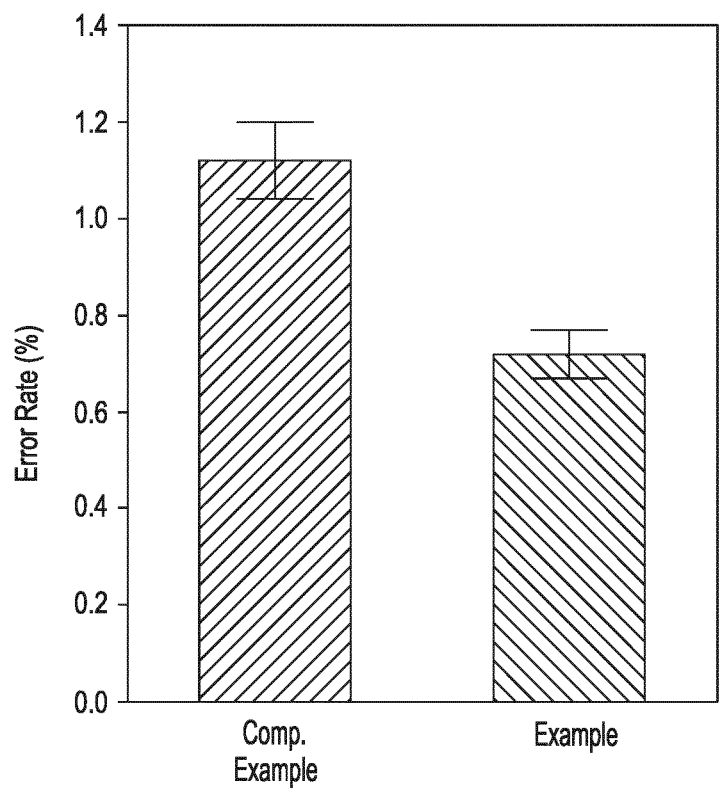
FIG. 7B is a bar graph depicting, in one example, the mean error rate for flow cell lanes including the example multi-arm polymeric hydrogel and comparative flow cell lanes including the comparative example polymeric hydrogel.

As depicted in Table 1, the sequencing results for the example multi-arm polymeric hydrogel were better than (e.g., PF %, Q30, error rate) or comparable to (e.g., C1 intensity, phasing and pre-phasing) the comparative example polymeric hydrogel. The mean C1 intensity for all the lanes is shown in FIG. 7A. The mean C1 intensity for the example polymeric hydrogel was about 275, while the mean C1 intensity for the comparative example polymeric hydrogel was about 250. These results illustrate that the intensity of the example polymeric hydrogel is as good as, and even better than the comparative example polymeric hydrogel. The mean error rate for all the lanes is shown in FIG. 7B. The mean error rate for the example polymeric hydrogel was about 1.5 times less than the mean error rate for the comparative example polymeric hydrogel. Therefore, over all the lanes, the example multi-arm polymeric hydrogel performed better than the comparative example polymeric hydrogel in terms of C1 intensity and error rate.

Example 6

The example multi-arm polymeric hydrogel and the comparative polymeric hydrogel of Example 1 were also used in this example. Each of the hydrogels was respectively coated in the depressions of four glass (specifically fused silica) flow channels (lanes) of two patterned flow cells, and 0.1-50 µM oligonucleotide primers were grafted on each of the polymer layers.

Several sequencing cycles were performed in each of the flow channels using a human library with 1% PhiX library.

Figure 8A:
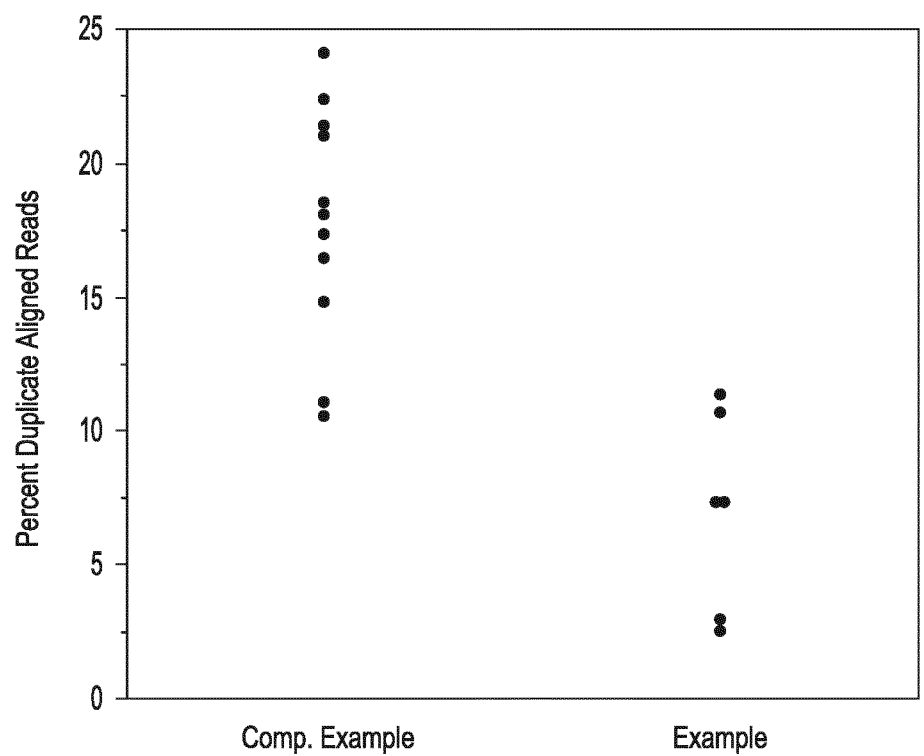
FIG. 8A is a graph depicting, in one example, the percentage of duplicate reads detected during sequencing cycles for an example flow cell lane including the example multi-arm polymeric hydrogel and a comparative flow cell lane including the comparative example polymeric hydrogel.

Duplicate read data was collected for one lane of the example flow cell and for one lane of the comparative example flow cell over the sequencing cycles. Sequencing reads may be determined to be duplicates if both forward and reverse reads have identical starting positions. A lower percentage of duplicates is desirable. The duplicate read results are shown in FIG. 8A. As depicted, the example flow cell including the example multi-arm polymeric hydrogel exhibited few duplicate reads over the sequencing runs. In particular, the percentage of duplicate reads for the example flow cell ranged from about 2.5% to about 12%. In contrast, the comparative flow cell had much higher percentages of duplicate reads, ranging from about 10% to about 24%.

Figure 8B:
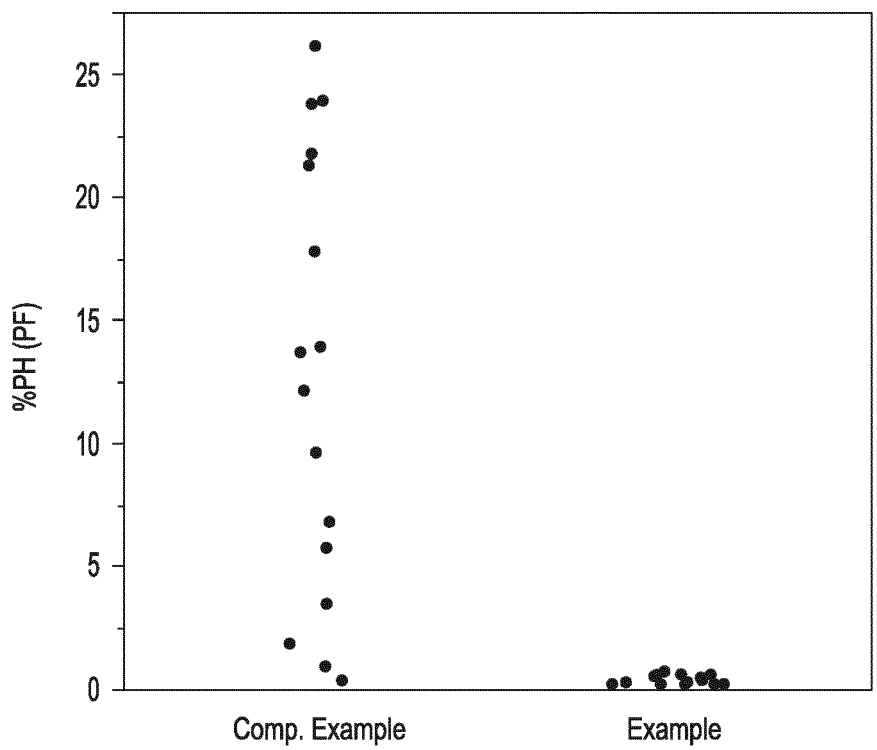
FIG. 8B is a graph depicting, in one example, the percentage of pad hopping detected during sequencing cycles for a flow cell lane including the example multi-arm polymeric hydrogel and a comparative flow 1 s including the comparative example polymeric hydrogel.

Pad hopping data was also collected for one lane of the example flow cell and for one lane of the comparative example flow cell over the sequencing cycles. Pad hopping refers to the process of several adjacent depressions being amplified from the same template sequence, due to the template "hopping" to an adjacent depression during cluster generation. A lower percentage of pad hopping is desirable. The pad hopping results are shown in FIG. 8B. As depicted, the example flow cell including the example multi-arm polymeric hydrogel exhibited little (e.g., <about 1%) to no pad hopping over the sequencing runs. In contrast, the comparative flow cell including the comparative example polymeric hydrogel exhibited much higher pad hopping levels, ranging from about 1% to about 27%.

The results of all of the examples indicate that the multi-arm polymeric hydrogel can be used on a variety of different flow cell architectures, can improve sequencing metrics, and can also improve dry storage stability (e.g., sequencing performance is not deleteriously affected even after a period of dry storage).

ADDITIONAL NOTES

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range, as if such values or sub-ranges were explicitly recited. For example, a range from about 200 mm to about 300 mm, should be interpreted to include not only the explicitly recited limits of from about 200 mm to about 300 mm, but also to include individual values, such as about 240 mm, about 250.5 mm, etc., and sub-ranges, such as from about 225 mm to about 275 mm, etc. Furthermore, when "about" and/or "substantially" are/is utilized to describe a value, they are meant to encompass minor variations (up to +/−10%) from the stated value.

While several examples have been described in detail, it is to be understood that the disclosed examples may be modified. Therefore, the foregoing description is to be considered non-limiting.

The invention claimed is:

1. A hydrogel, comprising:
    a dendritic core formed from 3,5-Bis(2-dodecylthiocarbonothioylthio-1-oxopropoxy)benzoic acid, 1,1,1-Tris[(dodecylthiocarbonothioylthio)-2-methylpropionatelethane, or Pentaerythritol tetrakis[2-(dodecylthiocarbonothioylthio)-2-methylpropionate], wherein the dendritic core has from 2 arms to 30 arms;
    a first acrylamide monomer incorporated into each arm of the dendritic core, the first acrylamide monomer having a structure:

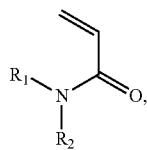

wherein $R_1$ and $R_2$ are independently selected from the group consisting of an alkyl, an alkylamino, an alkylamido, an alkylthio, an aryl, a glycol, and optionally substituted variants thereof; and
    a second acrylamide monomer incorporated into each arm of the dendritic core, the second acrylamide monomer having a structure:

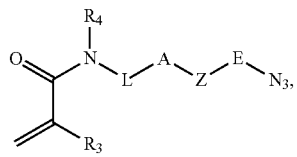

wherein $R_3$ is hydrogen or an alkyl; $R_4$ is hydrogen or an alkyl; L is a linker including a linear chain of 2 atoms to 20 atoms wherein each atom is independently selected from the group consisting of carbon, oxygen, and nitrogen and optional substituents on any carbon and any nitrogen atoms in the chain; A is an N substituted amide having a structure

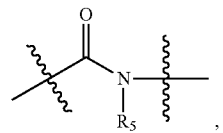

where $R_5$ is hydrogen or an alkyl; E is a linear chain of 1 atom to 4 atoms wherein each atom is independently selected from the group consisting of carbon, oxygen and nitrogen, and optional substituents on any carbon and any nitrogen atoms in the chain; and Z is an optional nitrogen containing heterocycle.

2. The hydrogel as defined in claim 1, wherein the first acrylamide monomer is N,N-dimethylacrylamide.

3. The hydrogel as defined in claim 1, wherein the first acrylamide monomer and the second acrylamide monomer form a block copolymer, a random copolymer, a statistical copolymer, or an alternating copolymer in each arm of the dendritic core.

4. The hydrogel as defined in claim 1, wherein second acrylamide monomer is azido acetamido pentyl acrylamide.

5. A hydrogel, comprising:
    a dendritic core formed from Bis[2-(2'-bromoisobutyryloxy)ethyl]disulfide, 2-Bromoisobutyric anhydride, Ethylene bis(2-bromoisobutyrate), Pentaerythritol tetrakis(2-bromoisobutyrate), Dipentaerythritol hexakis (2-bromoisobutyrate), and 1,1,1-Tris(2-bromoisobutyryloxymethyl)ethane, wherein the dendritic core has from 2 arms to 30 arms;
    a first acrylamide monomer incorporated into each arm of the dendritic core, the first acrylamide monomer having a structure:

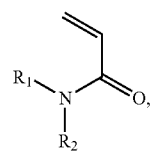

wherein $R_1$ and $R_2$ are independently selected from the group consisting of an alkyl, an alkylamino, an alkylamido, an alkylthio, an aryl, a glycol, and optionally substituted variants thereof; and
    a second acrylamide monomer incorporated into each arm of the dendritic core, the second acrylamide monomer having a structure:

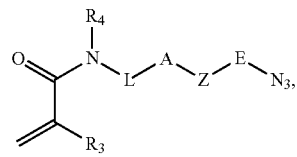

wherein R₃ is hydrogen or an alkyl; R₄ is hydrogen or an alkyl; L is a linker including a linear chain of 2 atoms to 20 atoms wherein each atom is independently selected from the group consisting of carbon, oxygen, and nitrogen and optional substituents on any carbon and any nitrogen atoms in the chain; A is an N substituted amide having a structure

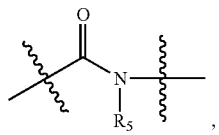

where R₅ is hydrogen or an alkyl; E is a linear chain of 1 atom to 4 atoms wherein each atom is independently selected from the group consisting of carbon, oxygen and nitrogen, and optional substituents on any carbon and any nitrogen atoms in the chain; and Z is an optional nitrogen containing heterocycle.

6. The hydrogel as defined in claim 5, wherein the first acrylamide monomer is N,N-dimethylacrylamide.

7. The hydrogel as defined in claim 5, wherein the first acrylamide monomer and the second acrylamide monomer form a block copolymer, a random copolymer, a statistical copolymer, or an alternating copolymer in each arm of the dendritic core.

8. The hydrogel as defined in claim 5, wherein second acrylamide monomer is azido acetamido pentyl acrylamide.

9. A hydrogel, comprising:
a dendritic core formed from 1,3,5-tris((4-(1-((2,2,6,6-tetramethylpiperidin -1-yl)oxy)ethyl)benzyl)oxy)benzene and 1,3,5-tris((3,5-bis((4-(1-((2,2,6,6-tetramethylpiperidin-1-yl)oxy)ethyl)benzyl)oxy)benzyl)oxy) benzene, wherein the dendritic core has from 2 arms to 30 arms;
a first acrylamide monomer incorporated into each arm of the dendritic core, the first acrylamide monomer having a structure:

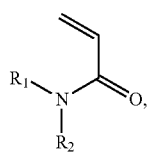

wherein R₁ and R₂ are independently selected from the group consisting of an alkyl, an alkylamino, an alkylamido, an alkylthio, an aryl, a glycol, and optionally substituted variants thereof; and
a second acrylamide monomer incorporated into each arm of the dendritic core, the second acrylamide monomer having a structure:

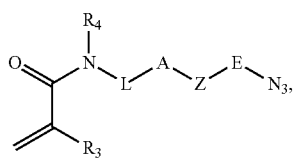

wherein R₃ is hydrogen or an alkyl; R₄ is hydrogen or an alkyl; L is a linker including a linear chain of 2 atoms to 20 atoms wherein each atom is independently selected from the group consisting of carbon, oxygen, and nitrogen and optional substituents on any carbon and any nitrogen atoms in the chain; A is an N substituted amide having a structure

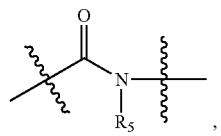

where R₅ is hydrogen or an alkyl; E is a linear chain of 1 atom to 4 atoms wherein each atom is independently selected from the group consisting of carbon, oxygen and nitrogen, and optional substituents on any carbon and any nitrogen atoms in the chain; and Z is an optional nitrogen containing heterocycle.

10. The hydrogel as defined in claim 9, wherein the first acrylamide monomer is N,N-dimethylacrylamide.

11. The hydrogel as defined in claim 9, wherein the first acrylamide monomer and the second acrylamide monomer form a block copolymer, a random copolymer, a statistical copolymer, or an alternating copolymer in each arm of the dendritic core.

12. The hydrogel as defined in claim 9, wherein second acrylamide monomer is azido acetamido pentyl acrylamide.

13. A flow cell, comprising:
a substrate; and
a hydrogel according to claim 1 on the substrate.

14. The flow cell as defined in claim 13, wherein the substrate includes a plurality of depressions separated by interstitial regions, and wherein the hydrogel is positioned within each of the depressions.

15. The flow cell as defined in claim 13, further comprising amplification primers grafted to the hydrogel.

16. The flow cell as defined in claim 13 wherein the substrate includes a channel, and wherein the hydrogel is positioned in the channel.

17. The flow cell as defined in claim 13 wherein:
the first acrylamide monomer and the second acrylamide monomer form a random copolymer in each arm of the dendritic core; or the first acrylamide monomer and the second acrylamide monomer form a statistical copolymer in each arm of the dendritic core; or the first acrylamide monomer and the second acrylamide monomer form an alternating copolymer in each arm of the dendritic core; or the first acrylamide monomer and the second acrylamide monomer form a block copolymer in each arm of the dendritic core.

* * * * *